United States Patent [19]
Trueblood

[11] Patent Number: 5,893,053
[45] Date of Patent: *Apr. 6, 1999

[54] COMPUTER GRAPHICS DATA RECORDING AND PLAYBACK SYSTEM WITH A VCR-BASED GRAPHIC USER INTERFACE

[75] Inventor: John Trueblood, San Diego, Calif.

[73] Assignees: Sony Corporation, Tokyo, Japan; Sony Electronics Inc., Park Ridge, N.J.

[ * ] Notice: The term of this patent shall not extend beyond the expiration date of Pat. No. 5,748,499.

[21] Appl. No.: 997,573

[22] Filed: Dec. 23, 1997

Related U.S. Application Data

[63] Continuation of Ser. No. 530,766, Sep. 19, 1995, Pat. No. 5,748,499.

[51] Int. Cl.$^6$ .............................. H04L 12/28; H04L 1/14
[52] U.S. Cl. .................. 702/187; 395/200.33; 345/332; 345/335
[58] Field of Search ....................... 702/187; 395/200.33; 345/332, 335

[56] References Cited

U.S. PATENT DOCUMENTS

| | | | |
|---|---|---|---|
| 5,097,411 | 3/1992 | Doyle et al. | 395/600 |
| 5,361,202 | 11/1994 | Doue | 364/413.01 |
| 5,386,503 | 1/1995 | Staggs et al. | 395/157 |
| 5,475,835 | 12/1995 | Hickey | 395/600 |
| 5,483,468 | 1/1996 | Chen et al. | 364/551.01 |
| 5,564,005 | 10/1996 | Weber et al. | 395/161 |
| 5,596,714 | 1/1997 | Connell | 395/183.14 |
| 5,603,034 | 2/1997 | Swanson | 395/701 |
| 5,611,050 | 3/1997 | Theimer et al. | 395/200.09 |
| 5,748,499 | 5/1998 | Trueblood | 395/200.33 |

OTHER PUBLICATIONS

Metheus X Window Record and Playback, XRP Features and Benefits, Sep. 1994, 2 pages.

*Primary Examiner*—John Barlow
*Assistant Examiner*—Bryan Bui
*Attorney, Agent, or Firm*—Limbach & Limbach L.L.P.

[57] ABSTRACT

A method and apparatus for recording and playing back computer graphics data, including cursor movement data, and audio data which requires no X-Window command extensions. During recording, the command data stream to a display controller is intercepted, time stamped at regular intervals, and sent to and stored in a first file in a mass storage device. Cursor movement and operation data also is intercepted, time stamped and stored in a second file. During recording, display state data is generated and recorded into a third file at specified intervals. For playback, the system operator is presented with a graphic user interface resembling the control panel of a video cassette recorder. The system operator can play back the recorded information starting from a designated instant by operating the "buttons" on the control panel. For playback, the third file is read and forwarded to the display controller. The first and second files are then merged utilizing the time stamps to ensure synchronization and forwarded in a stream to the display controller for playing back the recorded events.

5 Claims, 14 Drawing Sheets

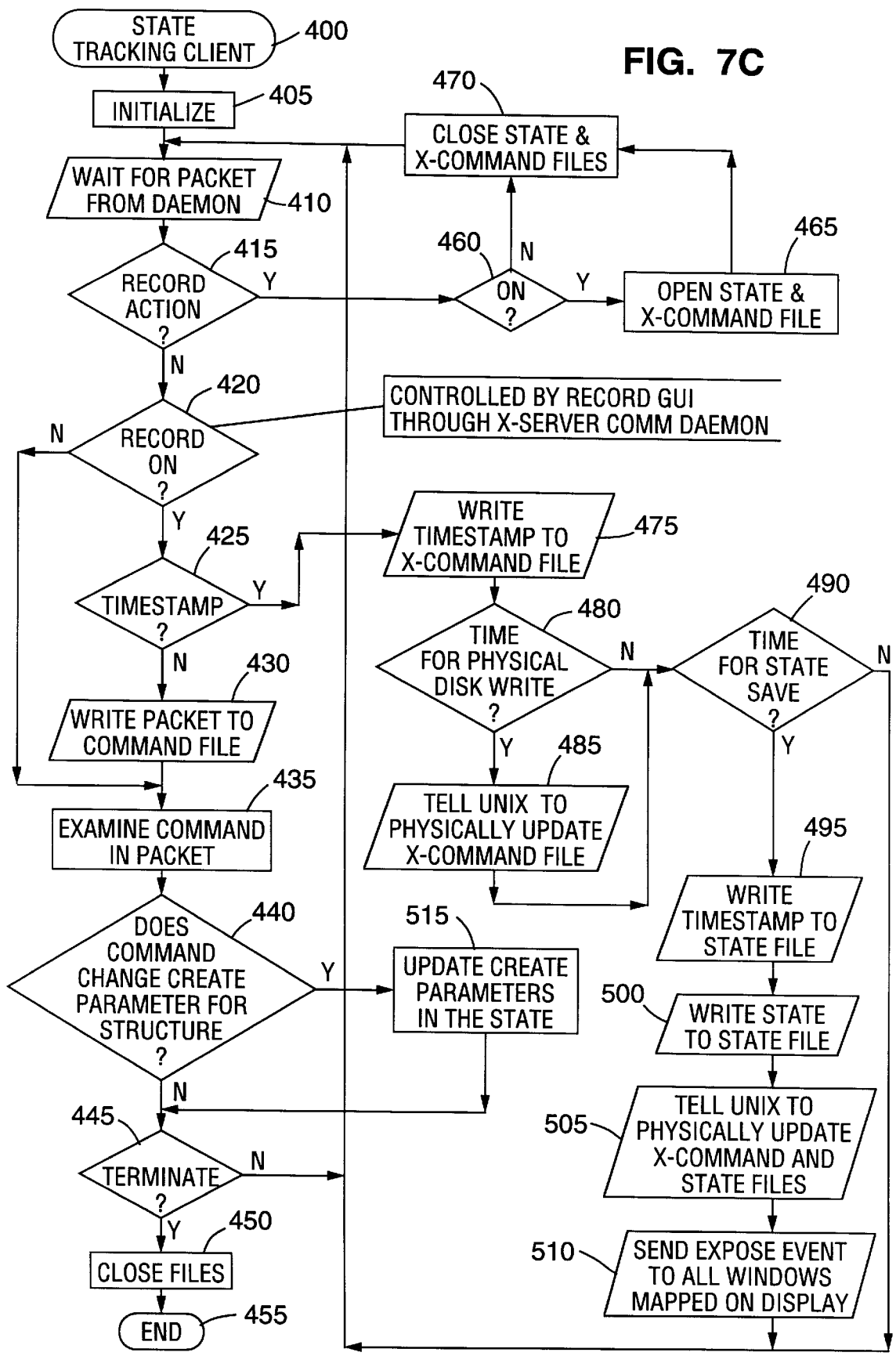

COMPUTER GRAPHICS DATA RECORDING AND PLAYBACK SYSTEM WITH A VCR-BASED GRAPHIC USER INTERFACE

This is a continuation of application Ser. No. 08/530,766, filed Sep. 19, 1995 U.S. Pat. No. 5,748,499.

FIELD OF THE INVENTION

The invention relates to a method and apparatus for recording and playing back a multimedia data session using a graphic user interface which emulates the look and feel of a video cassette recorder (VCR). More particularly, the invention is specifically adapted for use in recording and playing back X-Window data.

BACKGROUND OF THE INVENTION

X-Window is a standardized graphics language which is particularly adapted for use with UNIX-based computer operating systems. A comprehensive description of the X-Window protocol and language can be found in Adrianne Nye, *Xlib Programming Manual*, 3d edition, O'Reilly & Assoc., Inc. and Adrianne Nye (Editor), *Xlib Reference Manual*, 3d edition, O'Reilly & Assoc., Inc., both of which are incorporated herein by reference. X-Window is used in many graphics application environments. One such application is air traffic control display systems in which the flight of various aircraft in a designated air space is represented on computer display terminals which air traffic controllers can use to monitor air traffic.

In certain application environments, and particularly in the air traffic control environment, it would be advantageous to be able to record and playback the data which is displayed on the air traffic control terminal. It also would be advantageous to be able to record and playback the cursor movements and operations executed by an air traffic controller. The information is useful, for instance, in training air traffic controllers and for storing, retrieving and/or recreating air traffic incidents, such as aircraft collisions or near collisions and disappearance of aircraft.

Systems are available in the prior art for recording and playing back X-Window data. However, to my knowledge, these systems require customized extensions to the standard X-Window command protocol. The need for such extensions significantly limits the compatibility of the record and playback system with X-Window systems. Particularly, such record/playback systems cannot be used in conjunction with any X-Window system which does not also support the customized extensions needed for operation of the record/playback system.

Further, some of the record/playback systems utilize graphic user interfaces (GUIs) which require significant training and/or practice to master.

Accordingly, it is an object of the present invention to provide an improved method and apparatus for recording and playing back X-Window data.

It is another object of the present invention to provide an X-Window recording/playback system which requires no extensions to the standard X-Window protocol.

It is a further object of the present invention to provide an X-Window recording/playback system which is easy to learn and operate.

It is yet another object of the present invention to provide an X-Window recording/playback system which employs a graphic user interface which resembles a common consumer product, such as a VCR, so as to require virtually no training to operate.

It is yet a further object of the present invention to provide a method and apparatus for recording and playing back X-Window data with a high level of fidelity to the original recorded session.

SUMMARY OF THE INVENTION

The invention is an X-Window recording/playback method and apparatus which utilizes the standard protocol commands for the X-Window language without need for any extensions. In operation, the method and apparatus captures the X-Window command stream into the display controller and sends a copy of it to a mass storage device for storage. The X-window command stream is time-stamped at specified intervals of, for example, 10 milliseconds. Simultaneously, a software program retrieves the cursor movement and operation data stream from the display controller (e.g., a mouse) to the display device, time stamps that data, and stores it in a separate file in the mass storage device.

When it is desired to play back the stored information on a display device, the system operator enters the playback mode. In this mode, the system presents a graphic user interface on the display device which resembles the control panel of a video cassette recorder (VCR) and which essentially operates in the same manner. For instance, the system operator is presented with the image of a control panel bearing a series of buttons and displays, including buttons labeled play, fast forward, rewind, pause, frame advance, slow motion, file select, go to, and enter. The display windows on the face of the VCR include windows showing a counter value, a real time value, and a recorded time value. The VCR-based graphic user interface for playback mode also includes a message window shaped and positioned to resemble the cassette slot of a VCR. The message window displays information about the file currently selected, including file name, work station ID, and start and stop times.

The user, by use of a mouse cursor or a programmable function key, can operate any of the buttons in order to select a file and playback start time of recorded events. The system merges the X-Window command stream with the cursor event data stream, synchronizing them using the aforementioned time stamps and plays the data back so as to re-create the X-Window display as it actually appeared at the time of the actual recorded events. The system also provides for the addition of a time stamped audio track to be included with the playback. Such an audio track may be used, for example, to add the voice of an instructor for training purposes. Alternately, it may be used to add a recording of radio communications which occurred during the actual events recorded.

In addition to recording the command stream and cursor event stream, the program generates and stores in a third file state information at periodic intervals. The state information is needed in order to fully re-create a display without the need to commence playback from an initiation state of the display. The stream of command information alone only supplies information as to events occurring at that instant in the display. Accordingly, the existing state of the display at a given time other than upon initiation of the system may depend on commands that were executed earlier in the command stream. Accordingly, the current state of the display must be known in order to allow playback to be commenced from that point in time. Playback may be commenced at the beginning of any one of the periodic intervals for which the display state has been saved.

Accordingly, the interval is selected based on the desired resolution of starting points. In a preferred embodiment of the invention, the intervals are 20 seconds apart.

BRIEF DESCRIPTION OF THE DRAWINGS

FIGS. 7A through 7D are flow charts illustrating recording operation in a preferred embodiment of the present invention.

DETAILED DESCRIPTION OF A PREFERRED EMBODIMENT OF THE INVENTION

Figure 1:
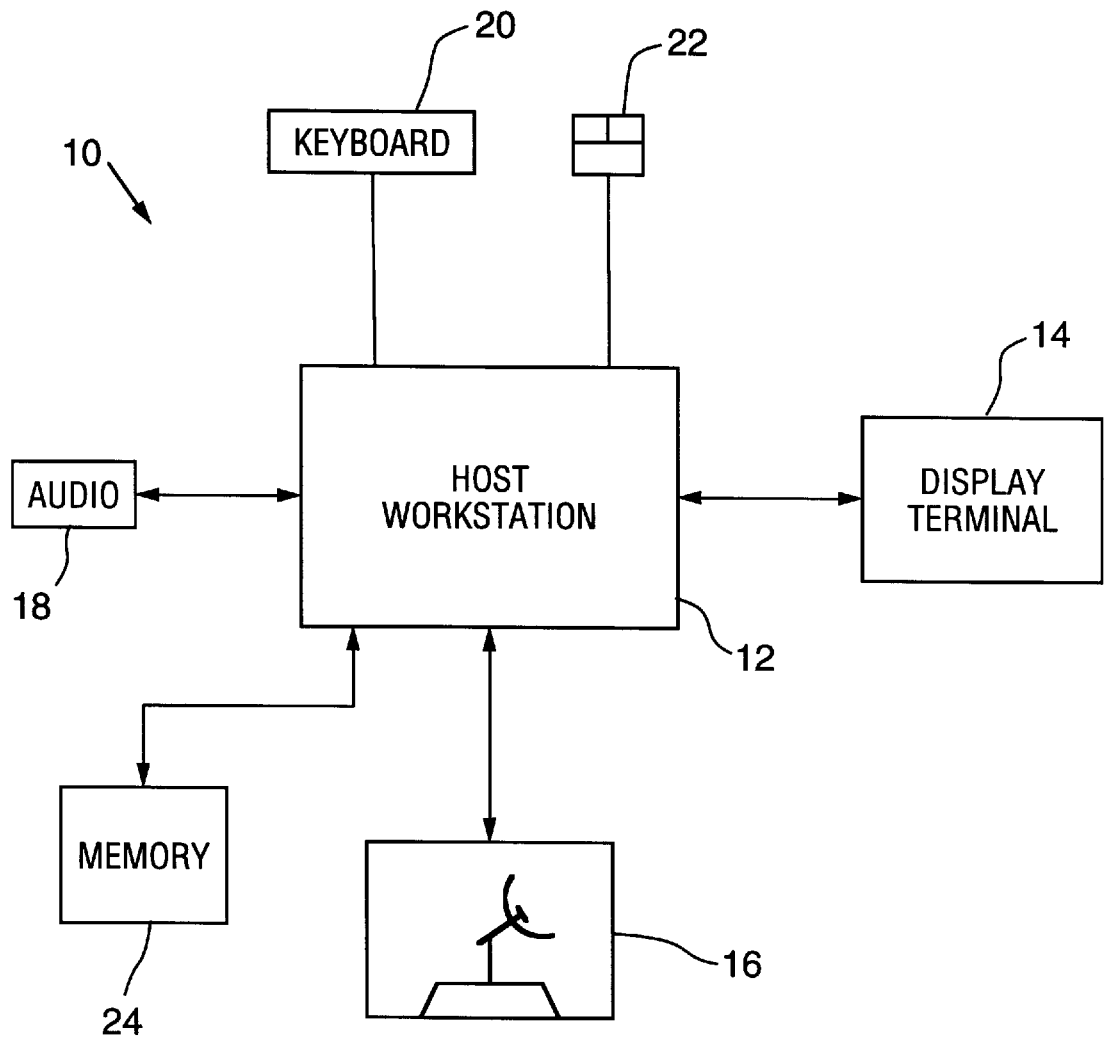
FIG. 1 is a block diagram of the hardware components of a graphics display record and playback system of a preferred embodiment of the present invention.

FIG. 1 generally illustrates the major hardware components of an air traffic control system 10 embodying the present invention. An air traffic controller (not shown) interfaces with a host work station 12 through use of a keyboard 20 and mouse 22. The host work station 12 receives information through an appropriate I/O port from one or more sensory devices, such as a radar 16. The work station 12 includes appropriate software for translating the data incoming from the sensory device 16 in order to generate a meaningful display on raster display terminal 14. For instance, display terminal 14 may be caused to show a radar sweep display in which air crafts sensed by the radar system 16 are represented as pixel arrays (blips) in a mapped air space on the screen of the display terminal.

In a preferred embodiment of the invention, the host work station 12 also receives audio data 18 through another I/O port. As will be described further below, both the display data output to display terminal 14 and the audio data are recorded in a mass storage device 24, such as a hard disk drive.

The air traffic controller interfaces with the air traffic control program running on the host work station through one or more input devices such as a keyboard and a pointer device (such as a mouse, pen mouse, light pen, trackball, touch screen, etc.).

For instance, as a blip representing an aircraft appears on a display screen, the air traffic controller may move his mouse in order to position the cursor over that blip and click on it in order to open up a box for entering information pertaining to that aircraft. The controller could then use the keyboard to enter information such as the identity of the airline and flight number of the aircraft represented by the blip. Clicking on a second mouse button, for instance, might switch his audio equipment to transmit and receive on the channel utilized by that particular aircraft.

In the preferred embodiment described herein, the pointer device is a mouse. However, it should be understood that a mouse is simply an example of one of any number of possible input devices and that the invention can be easily adapted to work with any pointer device or other device which can directly affect the display without processing through an application program.

Figure 2:
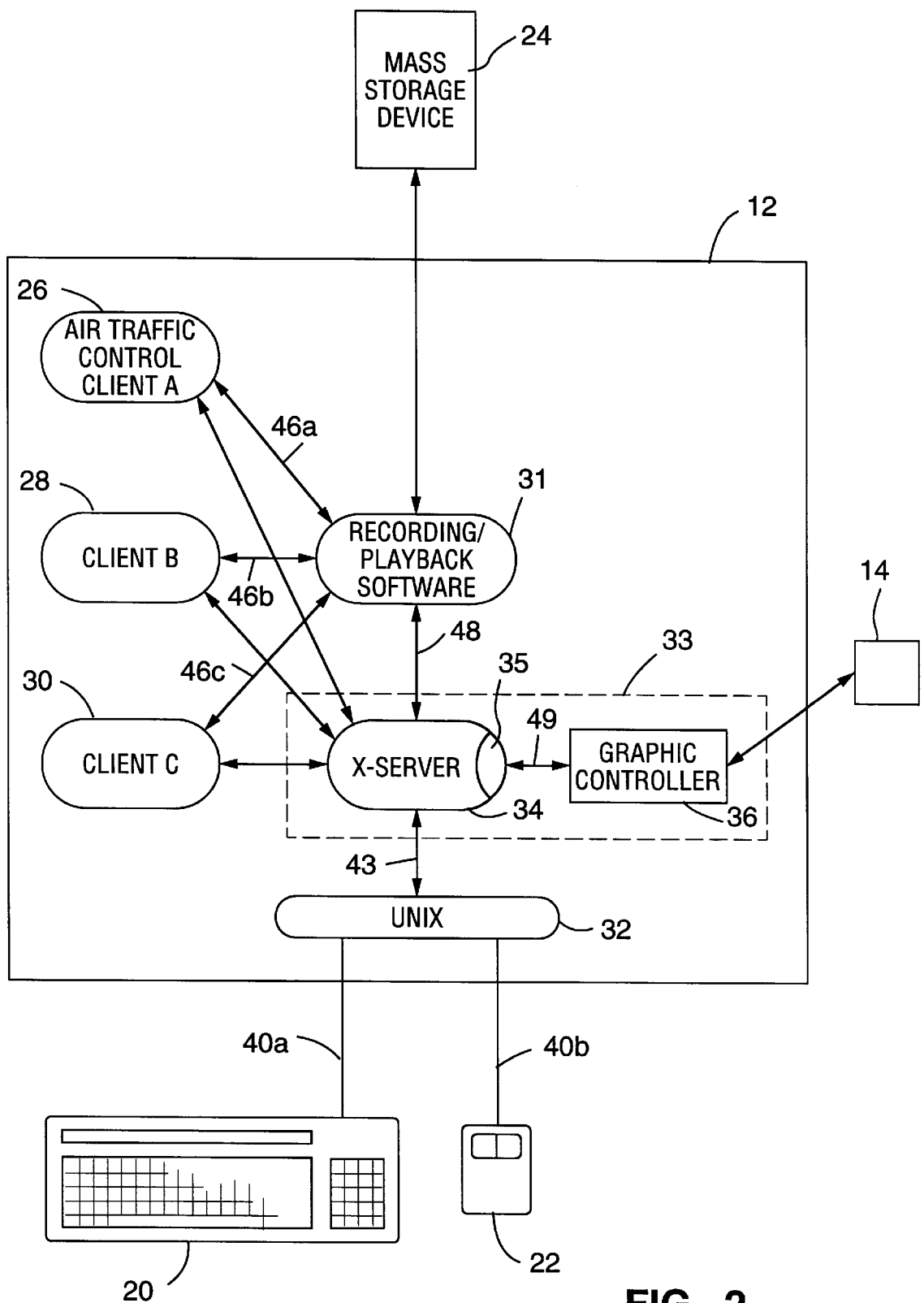
FIG. 2 is a software block diagram illustrating an exemplary work station embodying the present invention.

X-Window is a graphic display protocol and language which is particularly adapted for use in UNIX-based systems. FIG. 2 is a software block diagram illustrating the primary software components running on an exemplary work station being used in an air traffic control system,. In FIG. 2, software components are represented by oval or circular blocks, while hardware is represented by rectangular or square blocks.

As shown in FIG. 2, the host work station 12 contains one or more application (or client) programs 26, 28 and 30, such as the air traffic control program 26. A graphic controller card 33 includes an X-server 34 and graphic controller 36. The graphic controller card has its own processor. The X-server 34 receives X-Window commands and events and converts them into device specific actions understandable by the graphic controller 36. The graphic controller 36 further interprets those actions into a raster file which is written into the frame buffer. The contents of the frame buffer are written out to the display device to create a raster display on the screen of the display device 14.

There also is an operating system layer 32, such as UNIX. Recording/playback is accomplished by the recording/playback software construct 31.

The keyboard 20 and mouse 22 interface with the client programs through (1) a UNIX software layer 32, as illustrated by connections 40a and 40b, respectively, (2) the X-server 34, as illustrated by connection 43, and (3) the recording portion of the recording/playback software 31 of the invention, as illustrated by connection 48.

The client programs 26, 28 and 30 interface with the display 14 through (1) the recording portion of the recording/playback software 31, as illustrated by connections 46a, 46b, and 46c, respectively, (2) the X-server software layer 34, as illustrated by connection 48, and (3) the graphic controller 36, as illustrated by connection 49. In a system not adapted for recording/playback, the client programs would communicate with the displays with the X-server layer directly.

The mouse or other pointer device 22 communicates with the display terminal 14 through (1) the UNIX layer 32 (connection 40b), (2) the X-server 34 (connection 43), and (3) the graphic controller 36 (connection 49). Pointer movement also is monitored by the recording portion of recording/playback software 31, as illustrated by connection 48 from X-server 34.

Keyboard actions on the other hand, do not need to be observed by recording/playback software 31 because any effect which is to occur on the display as the result of a keyboard action are carried out by the client program after receiving the keyboard action from the X-server 34. Accordingly, keyboard actions are reported through the UNIX layer 32 (connection 40a), to the X-server 34 (connection 43) to the recording/playback software 31 (connection 48) where they are passed through to the client program (connections 46a, 46b and 46c). When a keyboard action is to have an effect on the display, the particular client program will then issue an X-protocol command to alter the display.

The X-server 34 receives X-window protocol commands from the client programs through the recording/playback software 31 and interprets them into specific graphic actions which drive the graphic controller card 36 through display driver 35. The recording/playback software intercepts the stream of X-protocol commands from the various sources and copies them into the mass storage device without interfering with the communication of the client programs and input devices with the X-server.

The X-Windows protocol is particularly adapted for network communication protocol. Accordingly, commands and events are transmitted between the various software constructs in packets. Any given packet may comprise less than a whole instruction to multiple instructions (depending on the length of the particular instructions). Thus, it should be understood that, although not always expressly noted in the following description of the invention, communication between software constructs occurs in packets. Thus, when a particular command or event is split between two or more packets, the software construct which is operating on the command or event will wait for the subsequent packet or packets in order to receive the entire command before operating on the command.

Recording

Figure 3:
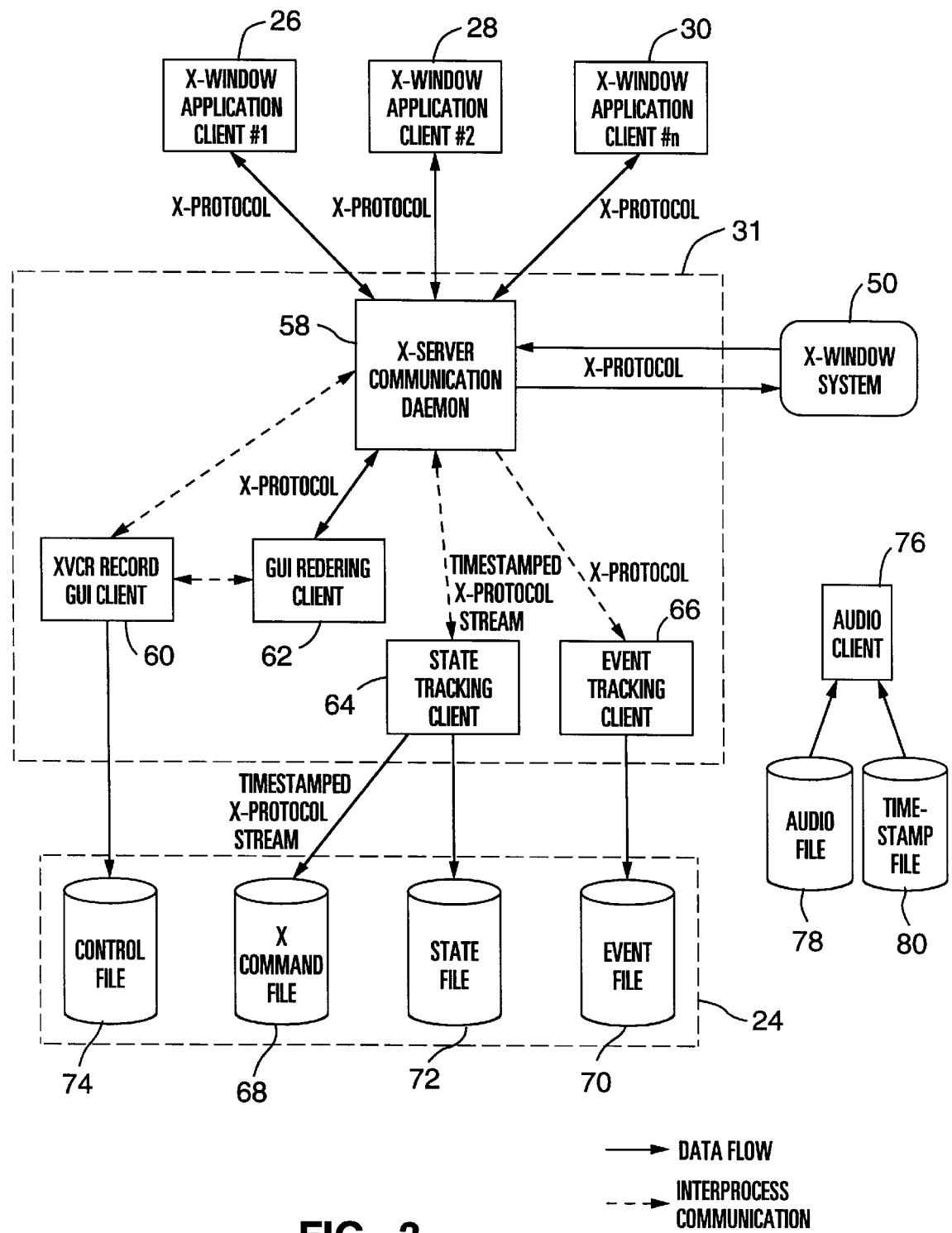
FIG. 3 is a software block diagram illustrating the software components utilized in the recording operation of a preferred embodiment of the present invention.

FIG. 3 illustrates in more detail the software components of the recording portion of the recording/playback software 31 for recording the X-Window communications of the client programs and input devices with the X-server 34 shown in FIG. 2. Note that, in FIG. 3, all blocks are software except for the barrel shaped blocks, which represent memory files. As illustrated, the X-server 34, graphic controller 36 and the display 14 from FIG. 2 are generally illustrated by box 50 labeled X-Window System in FIG. 3. In a preferred embodiment of the invention, an X-server communication daemon 58 is interposed between the application programs 26, 28 and 30 and the X-Window system 50. The X-server communication daemon 58 intercepts all X-protocol commands exchanged between the X-Window system 50 and the client programs 26, 28 and 30. All such commands are copied to the state tracking client 64. State tracking client 64 time-stamps the stream of X-protocol commands and writes the stamped stream out to an X-command file 68 in a mass-storage device 24, such as a hard disk drive.

The command stream is time-stamped by the state tracking client 64 by adding into the stream at fixed intervals real-time time stamps. In a preferred embodiment of the invention, the time stamp interval is 10 milliseconds.

Since recording sessions can (and typically will) last for significant amounts of time, it would be advantageous to begin playback of a recording from intermediate points in the recording. For instance, if a recording commenced at 6 am on a given day and lasted until noon on that same day, and it is desired to review an air traffic incident which occurred at 11 am that morning, it would be extremely inconvenient to have to play back five hours of undesired recorded information from 6:00 to 11:00 a.m. in order to review the 11:00 a.m. incident.

However, playback from any point in the recording session other than an initiation state of the system cannot be accomplished simply by reading out the X-command stream and pointer (e.g., cursor) events. Upon initiation of the system for recording and/or playing back, the system is initiated to a known state and playback can be accomplished by reading out the recorded information with the proper timing and synchronization to the X-Window System 50. However, if the X-command stream is read out of X-command file 68 commencing at any point other than the initiation state of the system, then the display will not be re-created faithfully because certain X-commands executed in the command stream preceding the point where playback commences may have lasting impact on the condition of the screen. For instance, X-commands which create or modify windows currently active on the screen, or create or modify off-screen pixel maps affect what is displayed on the screen long after those commands are executed. Also, certain input events which affect graphic contexts or allocated color maps may affect what is displayed on the screen long after their occurrence. Accordingly, in order to be able to start playback from an intermediate point in a recorded session, state tracking client 64 also includes programming for storing in a separate state file 70 information pertaining to all X-protocol commands in the command stream which may have an effect which lasts longer than the execution of the instruction. Particularly, state tracking client 64 takes all state-affecting X-protocol commands and interprets them into the appropriate X-lib calls on the screen. It creates and maintains a database in the state file 70 which contains all information needed to generate the structure needed by the X-server to re-create a state of the screen. Particularly, the state file stores the create parameters for each of the pixmaps, windows, color maps, cursors, fonts, and properties active in the display. It also stores the contents of the I/O buffer. As commands and events are observed in between each state save (e.g., every 20 seconds), the state tracking client 64 processes each command as follows. First, it checks the CREATE command that is used to create the type of structure that the present command addresses to determine all possible parameters for that CREATE command and whether the present command affects any of them. If it does, then state tracking client 64 modifies the appropriate parameter or parameters of the root CREATE command that it is holding in memory. When the next state must be saved, it then simply writes out the CREATE commands as modified over the past 20 seconds (as well as the contents of the I/O buffer) to the state file 70. The write to the file is preceded by the writing of a time stamp to the file.

Further, immediately after every state save to state file 70, the state tracking client 64 simulates an EXPOSE event for each window currently active in the display. In X-Window, an EXPOSE event causes the application program responsible for the particular window to draw the contents of the window. The recording/playback software 31 instructs the X-server 34 to issue the EXPOSE events to the relevant application program(s). The application programs then each issue a stream of X-Window commands to draw the contents of the relevant window(s). As is the case with all X-Window commands in the present invention, the stream is recorded by software 31 as well as supplied to X-server 34 for affecting the display on display device 14.

While the stream of commands issued by the application program(s) responsive to the EXPOSE events will actually have no visible effect on the display (because the display already is displaying the identical graphics dictated by the EXPOSE events), this action is needed in order to allow the playback portion of the recording/playback software to re-create the display during later playback. Particularly, while the information stored in the state file will allow for re-creation of all of the windows in the proper layer order and proper position, the information in the state file does not disclose the contents of the windows. Therefore, after the state file readout on playback, the X command stream stored in the command file following the state restoration time contains all commands necessary to draw the contents of the active windows in the display.

As will be described in greater detail below, because the state tracking client 64 issued the EXPOSE event for each active window immediately after each state save to the state file, the first commands which will be read out of the command file after a particular state is restored during playback will be the commands which draw the window contents. This will draw the contents of the windows, thus re-creating the original display.

A separate software component, the event-tracking client 66, receives all cursor events and stores them in an event file 72.

Both the event file and the X-command file are time stamped. However, the manner in which the X-commands are time stamped in the X-command file 68 and the manner in which the cursor events are time stamped in the event file 66 differ. Particularly, with respect the event file, each cursor event is preceded by a time stamp indicating the 10 millisecond (assuming this is the selected resolution of the system) interval in which the event occurred. Thus, if two cursor events occur within a given 10 millisecond window, each event will be stored in the event file preceded by its own time stamp, even though the two time stamps will be identical.

However, in the X-command file, when a plurality of X-commands are executed within a single 10 millisecond interval window, only one time stamp is recorded at the beginning of the interval. The time stamp is then followed by as many X-commands as were executed in that interval.

For every 10 millisecond interval in which at least one X-command is executed, a time stamp is recorded preceding the command. When no X-commands are executed within a 10 millisecond interval, a time stamp normally is not recorded. However, if the period between execution of X-commands during recording exceeds a specified time limit, e.g., 100 milliseconds, a time stamp will be recorded into the X-command file even though there are no X-commands which were executed during the 10 millisecond interval represented by that time stamp. As will become clear, this allows for maintenance of synchronization and updating of clock displays.

The system of the present invention further includes an X-VCR record graphic user interface (GUI) client 60 and a control file 74. The X-VCR record GUI client 60 extracts information from user input, such as a file label, description (i.e., air sector ID, screen state storage intervals) and stores it in control file 74. The record GUI client 60 also extracts and stores in control file 74 work station data accessible through UNIX, such as start and stop time of the recording and work station ID.

Finally, the GUI-rendering client 62 is a software component involved in the drawing of the VCR-based graphic user interface (GUI) on the screen. The GUI-rendering client 62 is maintained as a separate software construct so that an OEM customer can easily remove that portion from the system and replace it with its own GUI, if desired. Alternately, a customer may decide not to use any GUI, but simply to use a more traditional application program interface (API) in which commands for controlling record and playback operation are entered at the operating system level, e.g. UNIX, by typing instructions on a keyboard, rather than through use of a GUI.

Even further, programmable function keys can be used for controlling recording and playback either in conjunction with a GUI or without.

In a preferred embodiment of the invention, means also are provided for recording an audio channel. In such an embodiment, an audio client software construct 76 records a relevant audio program (e.g., the communications between the air traffic controller and the various aircraft) into an audio file 78. The audio client 76 stores in a separate time-stamp file 80 time stamps synchronized to the video portion. The audio client is connected to separate audio hardware and is not directly connected to the video hardware or software illustrated in FIG. 3.

In the present invention, the graphics software is platform-independent and can operate on any work station embodying an appropriate operating system. However, when audio is included, the audio client communicates with the audio hardware of the work station, thus making the overall system no longer platform-independent.

In a preferred embodiment of the invention, all data exchanged between the individual software components shown in FIG. 3 is buffered. For instance, all cursor events are written to a buffer. Once per second, the event-tracking client 66 issues a GET MOTION command which causes the contents of the buffer to be read out to the event-tracking client. The event-tracking client 66 then stores the information in the event file 72.

Playback

Figure 4:
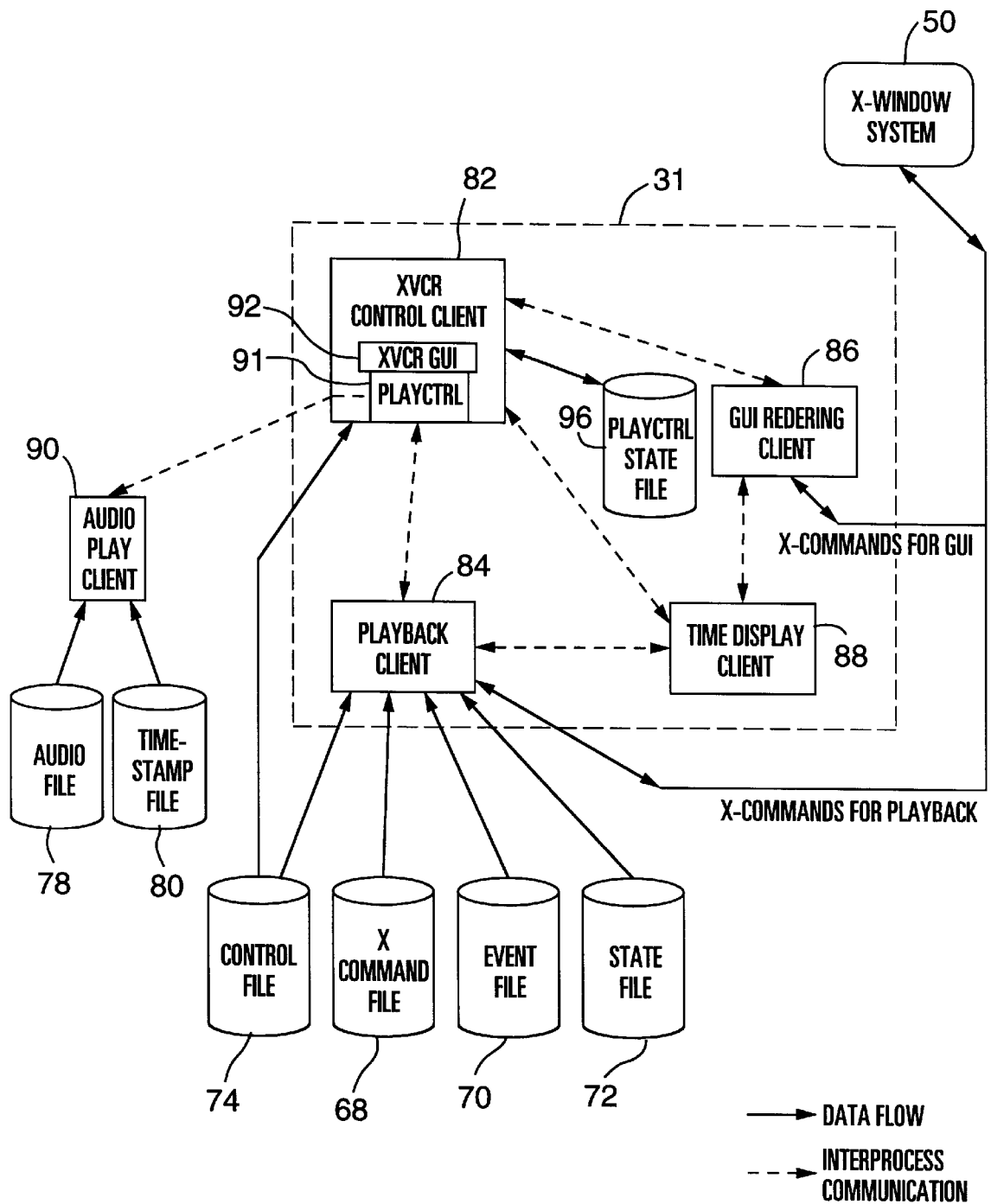
FIG. 4 is a software block diagram illustrating the software components utilized in the playback operation of a preferred embodiment of the present invention.

FIG. 4 is a software block diagram illustrating the software components utilized for playing back a recorded session or portion thereof. An X-VCR client 82 comprises two primary portions, namely, a GUI control client 92 and a play control client 91. As will be described in greater detail below, the play control client 91 interfaces with a play control state memory device 96. Preferably, the memory device 96 is a small-scale, high-speed memory such as a DRAM.

A GUI-rendering client software construct 86 generates the playback GUI and communicates directly with the X-Window system 50 to cause the playback GUI to be displayed on the display screen. The time display client 88 communicates with the GUI-rendering client 86 and the play control client 91. The time display client 88 generates all of the clocks and counters which are displayed on the playback VCR face. These include a real time-of-day clock, a counter, and the time of the recording at the current position of the playback file.

The playback client 84 and the audio play client 90 are the primary software components for recreating the audio and graphic display during playback. The playback client 84, under control of the X-VCR GUI control client 82, begins playback at a specified point of time entered by the system operator. During playback, the playback client 84 receives a stream of X-commands from the X-command file 68, converts them to X-lib calls and forwards them to the X-server in the X-Window system 50. The X-Window system treats the incoming stream of X-lib calls from the playback client 84 as it would any other stream of X-lib commands and creates a display in accordance therewith.

The playback software 84 is actually extremely similar to the state tracking client software 64 discussed above with respect to FIG. 3. In particular, they both perform basically the same functions with only a few differences. They both receive a stream of X-commands and convert them to X-lib calls. However, the state tracking client software 64 (1) operates during recording, (2) only operates on state-affecting commands, (3) receives those commands from the record daemon, and (4) sends the X-lib calls out to the state file. The playback client 84, on the other hand, (1) operates during playback, (2) operates on all X-commands, (3) receives those X-commands from the X-command file, and (4) forwards the X-lib calls to the X-Window System 50.

In a preferred embodiment of the invention, the playback client and the state tracking client share a significant portion of actual physical code. The code includes IFDEF instructions for differentiating between use as part of the state tracking client 64 or as part of the playback client 84.

The audio play client 90 essentially reads out the audio file and time stamp file and plays back the audio information through the audio hardware of the work station using the time stamps in the time stamp file 80 to synchronize the audio portion of the session with the graphic display portion.

As an example, let's assume that playback is to begin at the beginning of a recording session. The playback client 84 receives from the play control client 91 start time information entered by the system operator. The playback client 84 opens the X-command file starting from the address corresponding to the beginning of the file. It then sends the time-display client 88 the time stamp for the point of entry into the X-command file. The GUI-rendering client 86 reads this time from the time-display client 88 and causes it to be displayed in an appropriate window in the VCR GUI. When the play button is "pressed", the playback client 84 begins reading X-commands from the X-command file and converting them into X-lib calls which are sent to the X-Window system 50.

Particularly, the time stamp intervals are synchronized to the work station master clock. Playback client 84 reads the next time stamp from the current position out of the X-command file. When the master clock reaches a time corresponding to that time stamp, the playback client 84 executes all of the X-commands which are stored in the X-command file between that time stamp and the next time stamp. Thus, as should be clear, system resolution is dictated by the time stamp interval.

Resolution, as the term is used herein, of recording and playback refers to the time accuracy of what is displayed on the display during playback as compared to the actual events. For instance, if the resolution of the system is 10 milliseconds, then, during playback, the exact timing of occurrences on the display will only be accurate to within 10 milliseconds.

The timing of multiple commands within an interval cannot be determined since X-commands are read out of the X-command file for each time interval at a rate dictated simply by the speed of the work station. On the other hand, the X-commands were recorded in the order in which they occurred and thus will be played back in the same order in which they originally occurred. Accordingly, while the resolution can be no greater than the time stamp interval, it is at least known that the X-commands within each 10 millisecond interval are being played back in the order in which they originally occurred.

While the playback client 84 is observing the time stamps in the X-command file and executing X-commands, it is also periodically checking time stamps in the cursor event file 70.

Particularly, the playback client 84 reads the first time stamp in the event file 70 which occurred subsequent to the specified start time. When the work station master clock reaches the corresponding time, it reads out and executes the cursor event corresponding to that time stamp. It then reads the time stamp corresponding to the next cursor event stored in the cursor event file so that it can be executed when the master clock reaches that corresponding time. As will be described in greater detail below, when events and commands share the same time stamp, the event is executed first. Accordingly, the resolution of events and commands is dictated strictly by the selected time interval for time stamps. Within a given 10 millisecond interval, the order of events relative to commands may not be true to the original. Accordingly, the time stamp interval should be selected carefully. It is believed that a time stamp resolution at least an order of magnitude greater than that deemed necessary be selected.

Meanwhile, the audio play client 90 reads out data from the audio file 78 starting at the specified start time using the time stamps in the time stamp file for synchronizing audio playback to the graphic output from the playback client 84. Thus, the audio play client 90 is coupled to the play control client 91 for time stamp synchronization purposes. However, the operations for actually outputting the audio data will be done separately through the audio hardware and software of the work station.

If playback is to commence at an intermediate point in the file, rather than the beginning of the session, then state file 72 becomes relevant. When starting from an intermediate position in the file, the playback client 84 reads out the state information corresponding to the state which precedes the indicated start time by at least a specified time period, e.g. two seconds. Thus, if the specified start time was within two seconds following a particular recorded state, it would be necessary to read out the state preceding that state (i.e. 20 seconds earlier, in the particular embodiment discussed herein).

It is necessary to start with a state preceding the specified start time by a particular interval because EXPOSE events may exist in the command stream. An EXPOSE event is an event which tells a client that all or part of a window has been uncovered. The client typically will respond to an EXPOSE event by redrawing the window or portion thereof which has been uncovered. Accordingly, retrieved state information must correspond to a time which precedes the specified playback start time by the maximum amount of time which could be required to redraw a window.

When playing back from an intermediate position in the file, the state preceding the indicated playback start time by the specified amount is retrieved from the state file. The playback client 84 executes the stored CREATE X-commands. As noted above in the discussion of recording, the state file contains the information needed to open and position all active windows needed to re-create the original display which was recorded, but does not contain the information needed to draw the contents of the windows. Since it is possible that the stacking order and parenting of windows can become extremely convoluted in real life, care must be taken in restoring the state to assure a proper hierarchy of restoration so that commands are not issued which affect windows which have not yet been created. In a preferred embodiment of the invention, therefore, all windows are first created parented to the root window with an arbitrary stacking order. After all of the windows are created, then the playback client 84 goes back and modifies the stacking and parenting parameters as needed. In this manner, none of the above-mentioned type of problems will occur.

The X-command stream from the X-command file 68 is then read out and executed up to the specified playback start time and halted. As noted above in the discussion of recording, the first commands which will appear in the X-command file after the state save time are the client commands issued responsive to the EXPOSE events which are issued immediately after each state save during recording and which will redraw the contents of the windows active in the display. In this manner, the state of the screen is restored properly to the correct condition.

As previously noted, the X-VCR GUI control client 82 comprises two discrete software components, namely the GUI control client 92 and the play control client 91. The GUI control client includes the overall playback control software and provides the control panel look and feel logic of a VCR. It exchanges information with the GUI-rendering client 86 in order to cause the GUI-rendering client to display the appropriate information in the VCR GUI. The play control client 91 is called by the GUI control client 92 to perform actual playback operations. Particularly, the play control client 91 translates the VCR actions into the appropriate action from the playback system. The play control client 91 performs an operation requested by the GUI control client 92 and terminates its operation.

In order that the play control client 91 can terminate after each operation, it utilizes a temporary disk file 96 which keeps track of the state of the playback system. This information includes information needed to render the GUI, such as the color of various buttons indicating whether they have been activated or not and the playback condition. For instance, if the pause button is "depressed", then its color is changed to orange to indicate that the device is in the pause mode. Also, the temporary disk file 96 also must store information as to what mode playback was in before being paused (e.g., was it play at half speed or play at full speed, or fast forward, etc.). Thus, whenever the play control client 91 is invoked, it can determine the current state of the system by reading out the contents of the disk file 96. It can then execute the requested operation, update the disk file 96 and terminate. As shown in FIG. 4, the play control client 91, therefore, is the software component which interacts with the playback client 84, the time display client 88 and the audio play client 90.

Alternately, a system operator may interact with the VCR control panel using programmable function keys on the keyboard, if so desired.

Graphical User Interfaces

Figure 5:
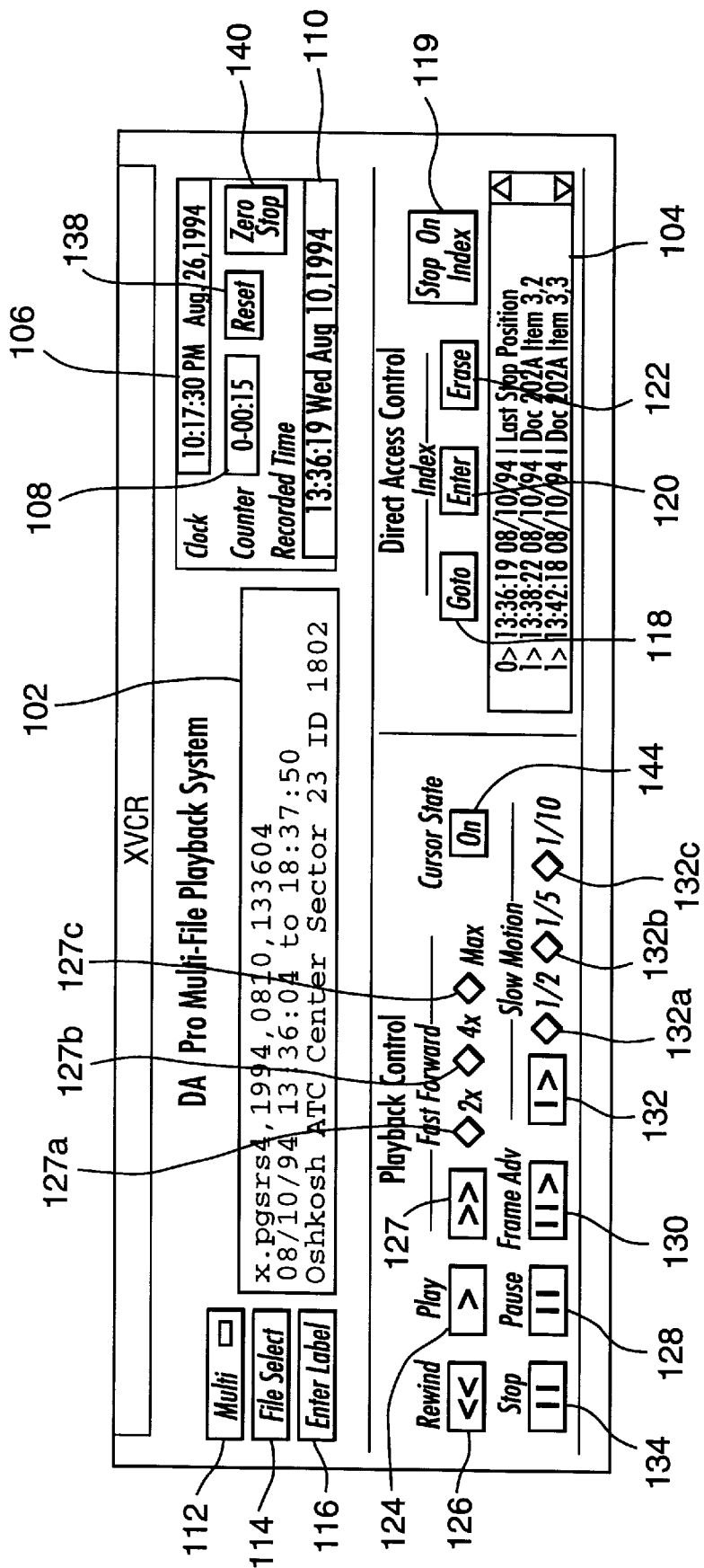
FIG. 5 is a depiction of a VCR-based playback graphic user interface of a preferred embodiment of the present invention.

FIG. 5 is a pictorial of an exemplary VCR-based graphical user interface for playback as it is presented on a display screen to the operator. A system operator can interact with the VCR control panel by use of a pointer device, such as a mouse. Any of the buttons can be "depressed" by placing the mouse cursor over the button and clicking on the mouse button. Data can be entered in one of the data fields, 102 and 104, by positioning the mouse cursor over the field or the label for the field, clicking the mouse button and then entering information using a keyboard. The clock, counter and recorded time displays 106, 108 and 110 are not directly controllable by the system operator.

The system operator is provided with three "buttons" for selecting and/or identifying files. A =MULTI button 112 can be "depressed" to allow multiple files (up to 3) to be played back simultaneously (on the same or different displays). When selected, the system operator can input up to three file names into display field 102 using a keyboard.

The FILE SELECT button 114 is depressed to select the file or files entered in the display window 102 once fully typed in (i.e., it is essentially an ENTER button).

The ENTER LABEL button 116, when pressed, allows the system operator to enter a convenient label for the file which appears in the display window 102, such as "Oshkosh ATC station center 23 ID 1802".

The GUI also provides four buttons for direct accessing (or indexing) within a file. The ENTER button 120 allows the operator to enter a time index into window 104. The operator can enter multiple indexes into window 104. The operator can use the mouse to click on any one particular index displayed in window 104 to select that index. The selected index will then become highlighted or otherwise visually differentiated from the other indices.

The GO TO button 118, when depressed, will cause the playback file to position itself in the playback file at the selected index. The STOP ON INDEX button 119, when depressed, will configure playback so as to stop when the index which was highlighted when the STOP ON INDEX button 119 was depressed is reached.

Finally, the ERASE button 122 will erase the index which was highlighted in window 104 at the moment when the ERASE button 122 is depressed. Index times are input in the format shown below:

format="hour:minute:second month/day/year".

In addition, the latest time at which a playback session stopped is always automatically entered as one of the indexes in window 104 and thereafter can be used with the GO TO, ERASE or STOP ON INDEX button.

There are thirteen playback control buttons. PLAY button 124, when depressed, commences playback of the recorded data file synchronized to the real time of the recording form the position currently indicated in the recorded time display window 110.

FAST FORWARD button 127 permits the system operator to fast forward through the file. In a preferred embodiment, 3 fast forward speeds, namely 2X, 4X and MAX are user-selectable by buttons 127a, 127b and 127c.

A REWIND button 126 resets playback to commence at the ZERO STOP time or the STOP ON INDEX time, if either or both are activated and either or both precedes the current position of the playback file or, if neither is activated, to the initiation state of the particular playback file.

PAUSE button 128 halts the video display on a single frame. The preceding mode (e.g., play or fast forward at 2X) is preserved for when the pause button is released.

The FRAME-ADVANCE button 130 permits the system operator to advance through the display on a single-frame basis. The default frame size is 10 milliseconds, but is user-selectable.

The SLOW-MOTION button 132 allows the recorded data to be played back at slower-than-real-time synchronization. In a preferred embodiment of the invention, 3 speeds, namely $\frac{1}{2}$, $\frac{1}{5}^{th}$ and $\frac{1}{10}^{th}$, are user-selectable by buttons 132a, 132b, and 132c.

Finally, the STOP button 134 stops playback. It is similar to the PAUSE button in operation except that the current mode is not preserved and another button must be "depressed" in order to resume an operation.

The clock display 106 shows the current time and date, including month, day and year. Optionally, there may be provided a CHANGE TIME button (not shown) for toggling between local time of day and universal time code. Preferably, all time displays (i.e, the times displayed in windows 102, 104, 106 and 110) would toggle simultaneously responsive to the CHANGE TIME button. Counter display 108 displays a relative time position within the playback file. It may be reset to zero at any point in the playback file. The RESET button 138, when depressed, resets the counter to zero at the current file position, thus establishing a reference marker. The ZERO STOP button 140 is pressed to toggle between a zero stop enabled mode and a zero stop non-enabled mode. When enabled, any transport function (e.g., play, fast-forward, rewind, slow-motion) will stop automatically when the counter reaches zero.

The recorded time display 110 shows the original time at which current playback position was recorded. The CURSOR-STATE-ON button 144 alternately enables and disables the playback of cursor events.

Figure 6:
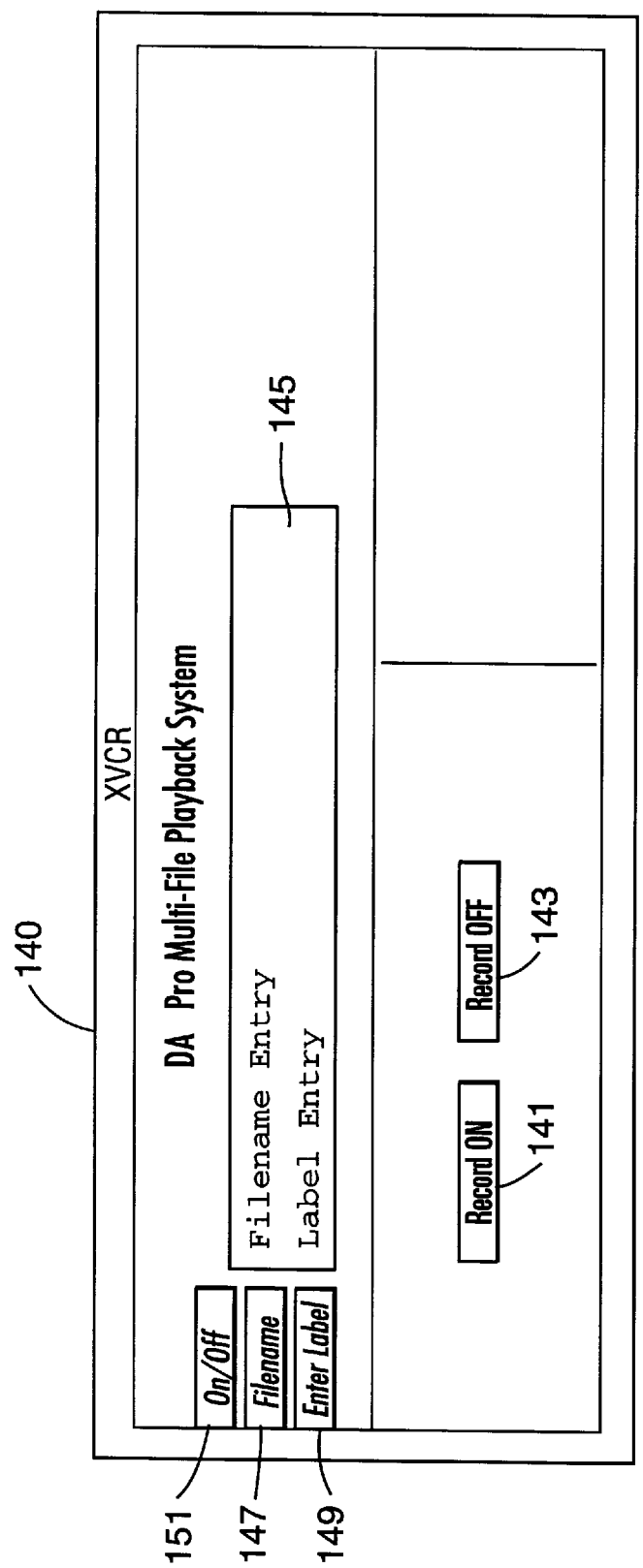
FIG. 6 is a depiction of a VCR-based record graphic user interface of a preferred embodiment of the present invention.

FIG. 6 is a pictorial of an exemplary record GUI. The record GUI 140 is much simpler than the playback GUI shown in FIG. 5 since the only "transport" function is record. Accordingly, RECORD ON and RECORD OFF buttons 141 and 143, respectively, are provided for turning the recording function on and off, respectively.

In addition, a cassette slot type window 145 similar to that found in the playback GUI also is provided within which the operator can enter a filename and a label. In one preferred embodiment, depressing a FILENAME button 147 calls up a window (not shown) within which the operator can enter a file name for a recording session which is being initiated. When the operator completes the entry of data, a second click on the FILENAME button will cause the pop-up window to disappear and the data just entered to appear in the "cassette slot" window 145. Alternately, the use of a pop up window can be deleted and the data can appear directly in window 145 as it is being entered.

An ENTER LABEL button 149 allows similar entry of a more convenient label for the recording session. The ON/OFF button 151 can be used to turn off the display of the Record VCR GUI, i.e., to cause it to disappear from the display. Obviously, since the Gui is not displayed when it is "off", this button cannot be used to turn the GUI on. Accordingly, a programmable function key is the preferred way to turn the Record GUI "on".

FIGS. 7A–7D are flow charts describing the processing for recording a session in accordance with one preferred embodiment of the present invention. The present invention is accomplished using no extensions to the X-protocol language. Accordingly, it is supportable on any work station and in any system with X-protocol capabilities.

In the flow charts of FIGS. 7A–7D and 8A–8E, the following conventions apply. The rectangles with double edged sides represent subroutines the details of which are shown in other flow charts. Regular rectangles represent processes. Parallelograms represent input/output operations. It should be noted that all graphic operations are considered input/output operations since any of the display screens could be on a different work station. The diamond shaped boxes represent decision steps. The open-ended boxes are comments relating to the box to which they are connected. Finally, the oval steps represent points of termination, i.e., either a start or an end of a routine. Also, it should be noted that X-Window is a network-based protocol and, therefore, communication between software constructs is accomplished in packets which may comprise anywhere from part of an instruction to multiple instructions. The flow charts take note of this convention to an extent. However, in order not to obfuscate the invention, the flow charts do not show the steps relating to assembling whole instructions from packetized communication. Such operations are not germane to the present invention and are common to all X-Window routines. Therefore, in the flow charts, one may simply assume that each packet contains a single complete instruction in order to any confusion. A resolution of 10 milliseconds is assumed.

Figure 7A:
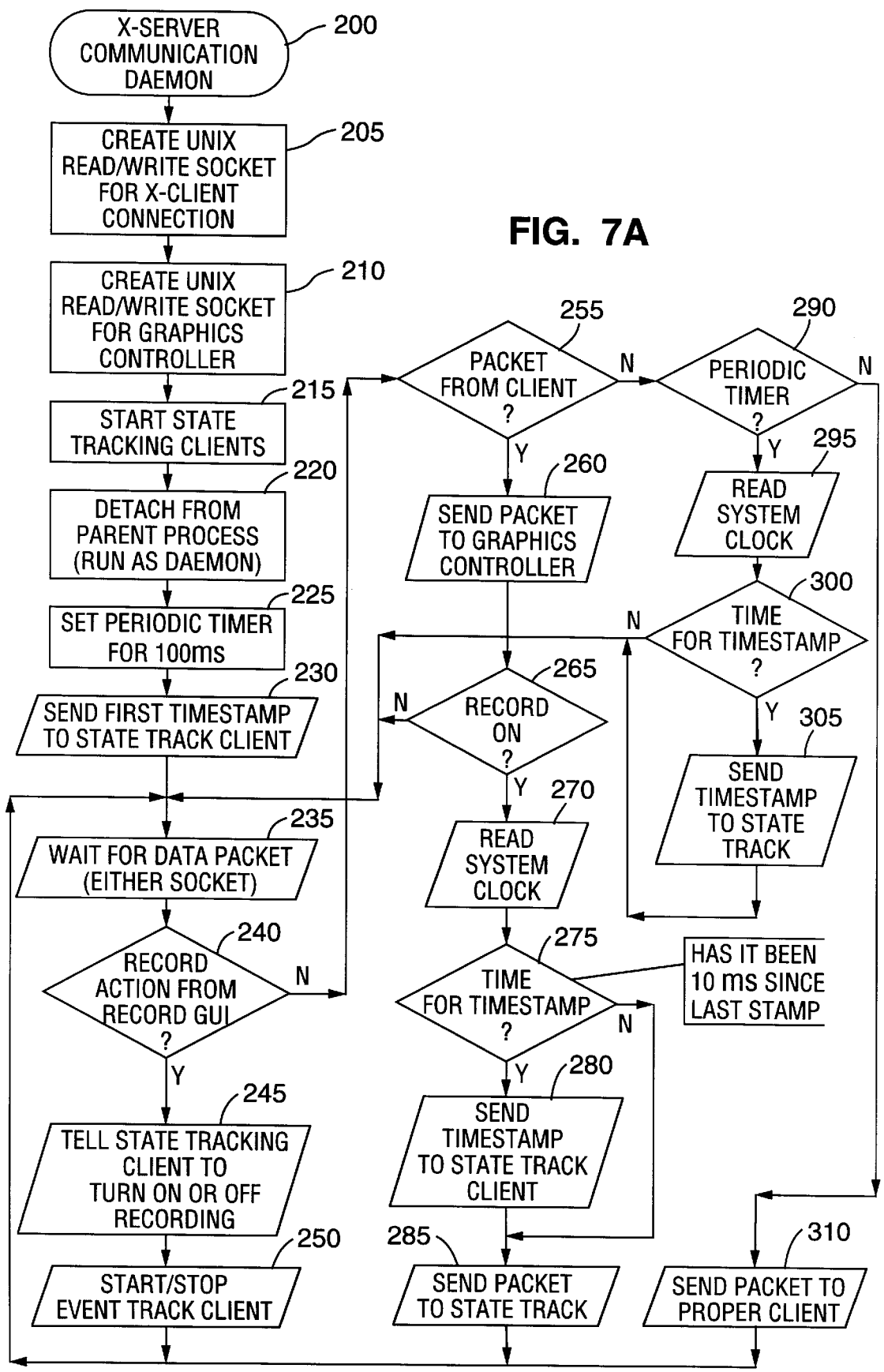

FIG. 7A is a flow chart of the process of the X-server communication daemon 58 of in FIG. 3. The process is entered at step 200. First, the software must create the sockets necessary for the prescribed communications. Accordingly, in step 205, the X-server communication daemon 58 creates UNIX read/write sockets for each of the client programs (e.g., 26, 28 and 30) with which it will need to communicate. In step 210, it creates a read/write socket for the graphics controller in X-window system 50 with which it also will interface.

In step 215, daemon 58 starts the recording clients, which include state tracking client 64, event tracking client 66, and GUI rendering client 62.

In step 220, according to standard UNIX procedure, the daemon detaches itself from the parent process so that it may run as an independent daemon.

In step 225, the daemon sets a periodic timer for 100 milliseconds, which will be the maximum time it will allow between saving time stamps in X-command file 68. In other words, 100 milliseconds is the maximum period that the daemon 58 will be allowed to sleep.

As the final initialization step, the daemon 58 sends the first time stamp to the state tracking client 64 in step 230.

The process then enters the main operating loop. In step 235, the daemon waits for a data packet from any source. In step 240, it determines whether the received data packet is a record action from the record GUI 60. If so, the action can be an instruction to turn recording on or off. If it is a record action, processing flows to step 245, in which daemon 58 tells the state tracking client 64 to turn on or off depending on the particular action from the record GUI 60.

As will be discussed in more detail below, the state tracking client runs at least a portion of its routine at all times, regardless of whether recording is on or off in order to allow recording to begin at a random point in time. Particularly, the state tracking client must know the current state of the display in order to begin recording. Accordingly, it constantly tracks state so that when recording is turned on at a random time, and step 245 is reached, state tracking client 64 can dump the state into state file 72 in order to save it and begin recording X-commands into file 68.

In step 250, daemon 58 starts or stops event track client 66 depending upon whether it was a record on or record off action. Unlike state tracking client 64, event tracking client 66 is completely off when recording is not occurring since there is no need to track events until recording commences.

Processing then flows back to the top of the loop and waits for another data packet in step 235. If the data packet is not a record action, processing flows through steps 235 and 240 to step 255. In step 255, daemon 58 determines whether the packet is from a client. If it is, the packet is sent to the graphics controller in step 260 in order to allow the X-Window system to update the display accordingly. In step 265, it is determined whether recording is on or off. If recording is off, then the daemon need do nothing with the packet other than simply forwarding it to the graphics controller as was done in step 260. Accordingly, if recording is off, processing flows back to the top of the loop. However, if recording is on, processing flows to step 270 where the daemon polls the system clock.

In step 275, the daemon determines if it is time for a time stamp to be recorded in the X-command file 68. Essentially, the daemon determines if it has been at least 10 milliseconds since the last time stamp was recorded. Particularly, as previously noted, many packets may be received in between time stamps. Thus, if the time stamp interval is 10 milliseconds and 15 packets are received in a single 10 millisecond interval, only one time stamp is recorded followed by the 15 instructions.

If it is time for a time stamp, processing flows to step 280 where the daemon sends a time stamp to the state tracking client 64 which, as discussed below, will record it in X-command file 68. However,if it is not yet time for a time stamp, step 280 is skipped.

In step 285, the packet is sent to the state tracking client 64. The state tracking client will operate on the data to record whatever information is necessary into X-command file 68 and possibly state file 72 as discussed more fully below. Processing then flows back to the top of the loop to wait for another data packet.

If the packet is neither a record action or a packet from the client, processing flows through steps 235, 240 and 255 to step 290. In step 290 it is determined whether the packet is an interrupt from the periodic timer (i.e., whether it has been 100 milliseconds since the last packet was sent to the state tracking client 68.) If it is, then processing flows through steps 295, 300 and 305, which are identical to previously described steps 270, 275 and 280, respectively. The flow in this branch of the process, however, does not include a step similar to step 285 since there is no packet to be sent to the state tracking client in this branch.

Finally, if the packet is none of the above, processing flows through steps 235, 240, 255 and 290 to step 310. In step 310, if the packet is none of the above, then it must be a packet sent from the X-server to a client. Accordingly, in step 310, the packet is sent to the proper client and processing is returned to the top of the loop to wait for the next packet.

The loop beginning at step 235 is an endless loop which will run continuously until the system is turned off.

Figure 7B:
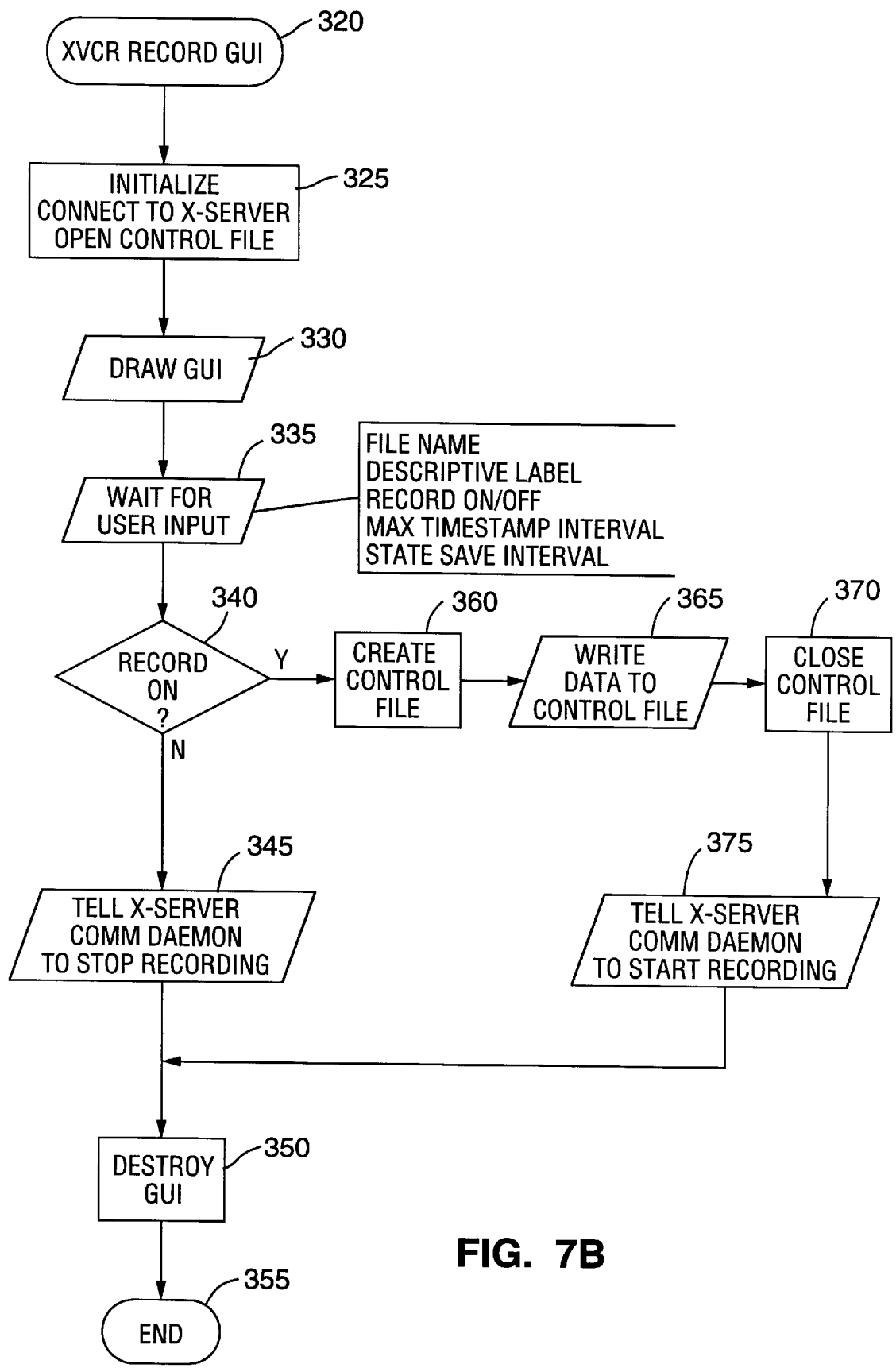

FIG. 7B shows the routine of the X-VCR record GUI client 60. The main purpose of the record GUI is to establish a control file, set up a file name, and turn recording on or off.

Accordingly, in step 325, the process initializes, connects to the X-server, and opens a control file. In step 330 it draws a record GUI, such as shown in FIG. 6, on the display. In step 335, it waits for a user input, which may include a file name, a descriptive label, a record on/off command, a definition of the maximum time stamp interval (which is user selectable) or a command indicating the state save interval (which is also user selectable). After receiving a user input, the process flows to step 340 where it is determined whether recording is on. If recording was previously turned on or is being turned on by the user input, then processing flows to step 360, where a control file is created (if the input is an on instruction) or a pre-existing control file is opened (if recording already was on) within which the above-described information, such as filename, etc., can be stored. In step 365, the X-VCR record GUI client 60 writes the data input by the user to the control file. In step 370, the control file is then closed.

In step 375, the X-server communication daemon 59 is told to begin recording. (See corresponding step 240 in FIG. 7A). Processing then flows to step 350 where the GUI is removed from the screen. The program is ended at step 355.

If, in step 340, recording is not on, i.e., then the user input was a command to turn recording off or was another command which would not be appropriate if recording is not on. Accordingly, processing flows to step 345. In step 345, the X-VCR record GUI 60 tells the X-server communication daemon 58 to stop recording. If the daemon already is not recording, then it simply ignores the instruction from step 345. Processing then flows through step 350 and 355 as previously described.

Flow chart 7C shows the routine of the state tracking client 64. The process is entered at step 400 and the necessary initialization is performed in step 405.

In step 410, the state tracking client waits to receive a packet from the daemon 58. When it does receive a packet, processing proceeds to step 415, where it is determined whether it is a recording action or not. If it is, processing flows to step 460 where it is determined whether the action is turning record on or off. If it is turning record on, processing flows to step 465 where the state tracking client opens the state file 72 and the X-command file 68. Processing then flows back to step 410 to wait for another packet from the daemon. If the record action is to turn recording off, then state tracking client 64 proceeds to step 470 where it closes the state file 70 and X-command file 68. Processing then returns to step 410 to wait for another packet from the daemon. If the received packet in step 410 is not a record action, processing flows through step 415 to step 420, where it is determined whether record is on.

If recording is on, processing flows to step 425 where it is determined if the packet was a time stamp.

If so, processing flows to step 475 where the time stamp is written into the X-command file 68.

Next, in step 480, it is determined whether it is time for a physical disk write. In particular, in UNIX, an actual physical write to the disk (i.e., to the state file or X-command file) may occur at any time, unless the program actually instructs UNIX when to write to file. In UNIX, writes to disk can be spaced as far apart as 30 seconds or greater. In air traffic control, it is desirable to have recorded information as current as possible in the event of a system crash. Thirty seconds is probably too long of a period to be acceptable for air traffic control purposes. Accordingly, state tracking client 64 will actually instruct UNIX to write to the disk at specified intervals (e.g., 5 seconds).

Accordingly, if it is determined in step 480 that it is time for a physical write to the disk, processing flows to step 485, where the state tracking client 64 instructs UNIX to physically update the X-command file 68. Processing then flows to step 490. If, however, it was not time for a physical disk write, processing flows directly from step 480 to step 490.

In step 490, it is determined whether it is time for a state save. (I.e., whether it has been 20 seconds since the last state save). If it is time for a state save, processing flows through steps 495–510. In step 495, a time stamp is written into the state file. In step 500, the state information is written to the state file. In step 505, UNIX is instructed to physically write to the X-command file 68 and state file 70. In step 510, state tracking client 64 sends commands through daemon 58 to the clients to cause them to send EXPOSE events to all windows mapped on the display. Processing then returns to step 410 to wait for another packet.

If, in step 490, it is not time for a state save, steps 495 through 510 are skipped and processing returns to step 410.

If, the packet was not a time stamp, processing flows from step 425 to step 430. In step 430, the packet is written to the command file 68. In step 435, the state tracking client 64 examines the command packet to determine whether the command is a state-affecting command. If so, processing flows to step 515 where the create parameters maintained by state tracking client 64 are updated accordingly. Processing then flows to step 445 where it is determined whether the packet is a terminate command. If not, processing flows back to step 410. If yes, then processing flows to step 450 and 455 where the X-command and state files are closed and the process ends.

Returning to step 420, if recording is not on, steps 425 and 430 are skipped, but not steps 435 et seq.

As previously noted, even when record is off, the state must be tracked in order to allow record to be turned on at a random point in time. Accordingly, even when record is off, processing must flow through steps 435, 440 and 515, as illustrated in FIG. 7C.

Figure 7D:
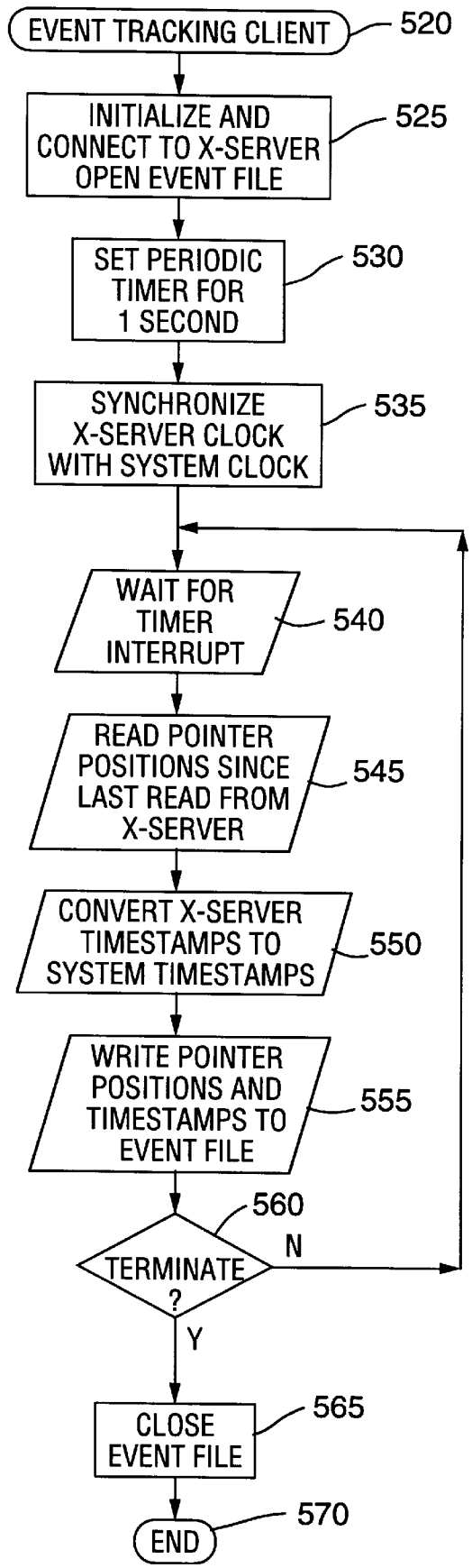

FIG. 7D shows the process of the event tracking client 66. The process is entered at step 520. In step 525, all initialization routines are run, the event tracking client connects to the X-server, and the event file 70 is opened.

In step 530, the event tracking client 66 sets a periodic timer to 1 second. This timer will be used to read out, at 1 second intervals, the event buffer which is maintained by the X-server. The interval is selected to assure that the buffer contents are stored before the buffer becomes full so that no data is lost.

Turning to step 535, it should first be noted that, an X-server in X-window has its own clock. This clock must be synchronized to the system clock. The X-server clock generates the time stamps and those time stamps must be synchronized to the system clock. Accordingly, in step 535, the X-server clock is synchronized with the system clock.

The event tracking client 66 then enters a loop commencing at step 540. In step 540, event tracking client 66 goes to sleep and waits for a timer interrupt (every one second as discussed above with respect to step 530). When it receives the interrupt, processing flows to step 545 where the X-server pointer buffer data is read out commencing at the end of the last read from the buffer. In step 550, the event tracking client converts the X-server time stamps to system time stamps. In step 555, the pointer positions are individually time stamped and written to the event file 70.

In step 560, the event tracking client determines whether it has received an instruction to terminate. If not, processing flows back up to the top of the loop to wait for the next interrupt. If yes, then even tracking client 66 closes the event file in step 565 and ends at step 570.

FIGS. 8A–8E are flow charts describing exemplary routines for playing back a session in accordance with a preferred embodiment of the invention. Playback is accomplished using no extensions to the X language. Accordingly, it is supportable on any work station and in any system with X-protocol capabilities.

Figure 8A:
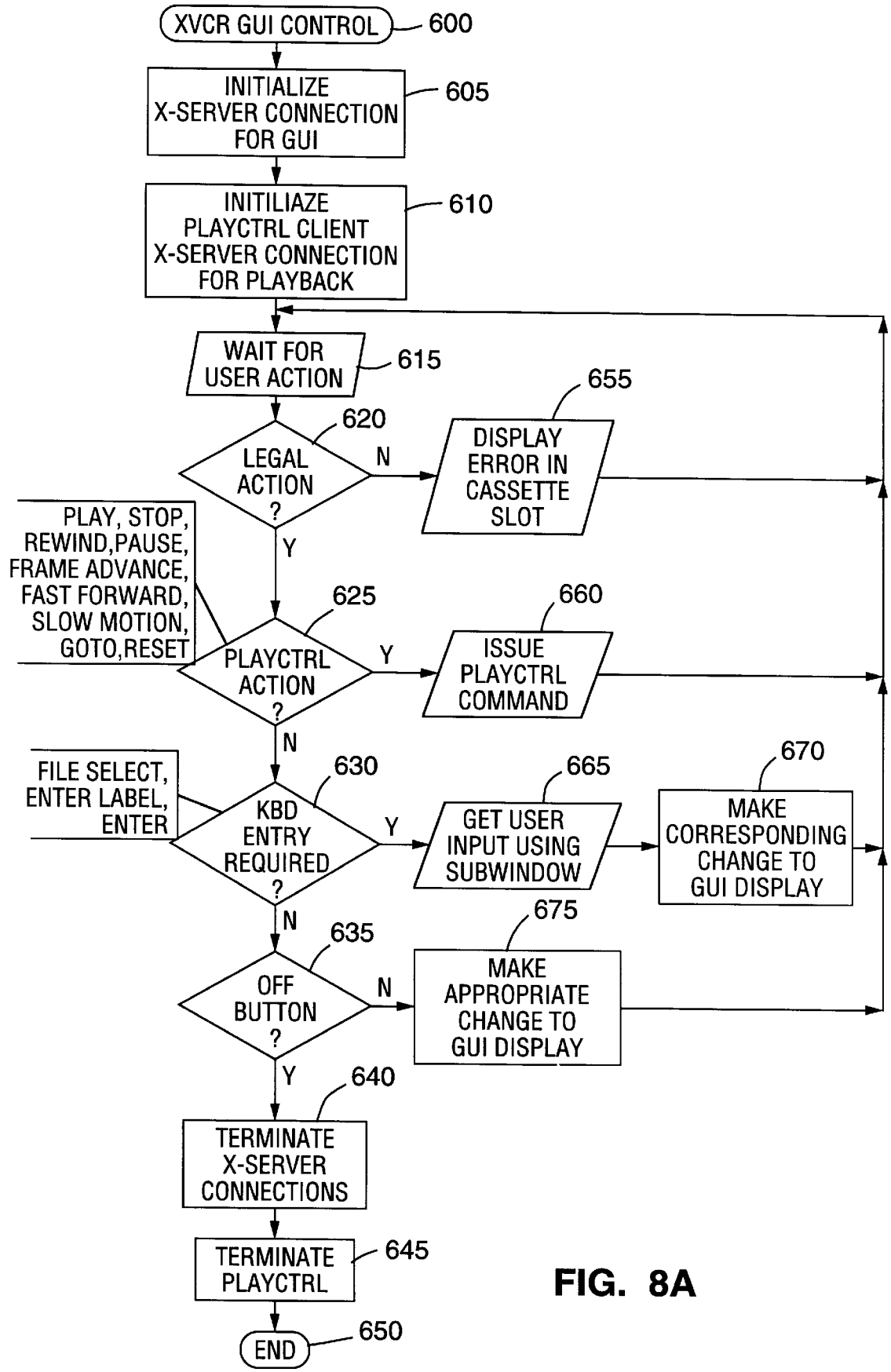
FIGS. 8A through 8E are flow charts illustrating playback operation in a preferred embodiment of the present invention.

FIG. 8A shows an exemplary flow chart for X-VCR GUI control construct 92 shown in FIG. 4. The process is entered at step 600. In step 605, the X-server connection for the GUI is initialized. In step 610, GUI control construct 92 initializes the play control client 91, and the X-server connection for playback. The process then enters the loop at step 615 where it waits for a user action.

When an action is received, processing flows to step 620 where it is determined whether the action was a legal action. If not, processing flows to step 655 where an error code or message is displayed on the screen and processing flows back to step 615.

However, if the action is legal, processing flows to step 625. If the action is a play control action, such as play, stop, rewind, pause, frame advance, fast forward, slow motion, go to, or reset, processing flows to step 660. In step 660, a play control command is issued to the play control client 91. As will be discussed in greater detail with respect to FIG. 8B, the play control client 91 performs whatever action is necessary and returns control to X-VCR GUI client 92. Processing then flows back to step 615 to wait for another instruction.

However, if the action is not a play control action, processing flows from step 625 to step 630. In step 630, it is determined whether the user action was an action which now required further data entry through the keyboard. Such actions include "depressing" the file select or enter label buttons. If so, processing flows to step 665, where the user is allowed to input the data. Processing then flows to step 660 where the input data is sent to the display to update the display. Processing then flows back to step 615 to wait for another action.

If the next user action is none of those previously discussed, processing will flow through step 620, 625 and 630 to step 635. In step 635, if the user action was "depression" of the off button, then processing flows to step 640 where the X-server connections are terminated. In 645, play control is terminated. Finally, the process ends at step 650.

If, however, the user action received in step 615 is none of those previously discussed, processing flows through steps 620, 625, 630 and 635 to step 675. If the user action was none of the above, then the action is one which requires only a change to the GUI without a corresponding change in play back operation (at this time at least). Such actions include entering labels, etc. Accordingly, in this step, an appropriate change is made to the GUI display responsive to the user action and processing is returned to the top of the loop to wait for another user action.

Figure 8B:
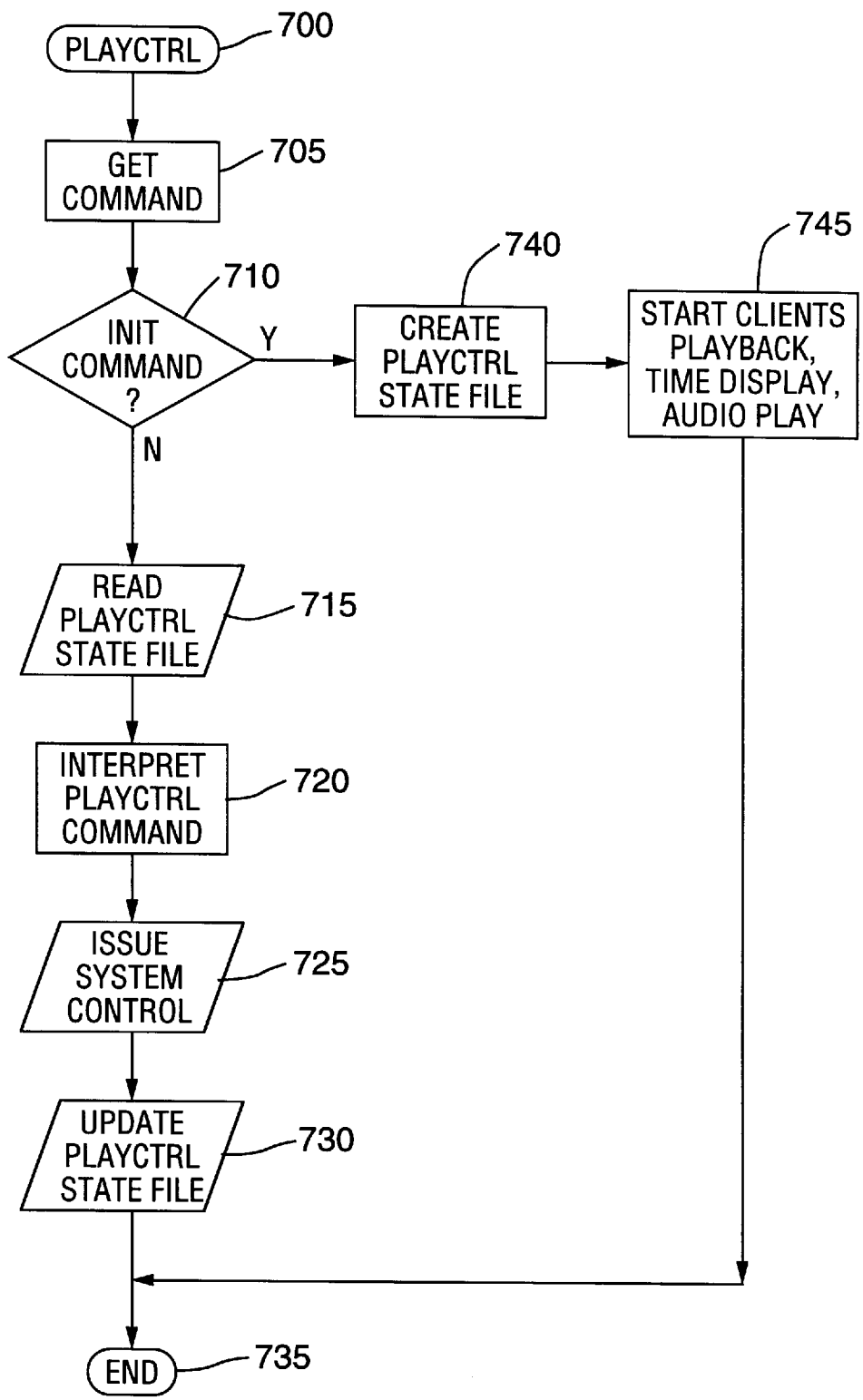

FIG. 8B illustrates the operation of the play control client 91. The process is entered through step 660 of FIG. 8A, as discussed above.

The routine is entered at step 700. In step 705, the play control client 91 gets the command from X-VCR GUI control client 92. In step 710, it determines whether the command was an initialization command. If so, processing flows to step 740 where the play control state file 96 is created. In step 745, play control client 91 then starts the audio play client 90, the playback client 84, and the time display client 88. Processing then flows to step 735, where control is returned to X-VCR GUI control client 92.

If, in step 710, it is determined that the command is not an initialization command, then it is a play control command. Accordingly, in step 715, play control client 91 reads the play control state file 96 to determine the current state of playback (e.g., playback at 2×speed, pause, etc.). In step 720, it interprets the play control command which it received in step 705. In step 725, it issues system controls in order to carry out the command. This step involves instructions to all of the relevant clients including the audio play client 90, the playback client 84 and the time display client 88.

Finally, in step 730, it updates the play control state file and proceeds to step 735 to terminate and return control to X-VCR GUI control client 92.

As previously noted, the play control state file 96 must be updated after every play control action because the play control client 91 must know the current state of play control in order to carry out certain commands. For example, when the pause button is released, the play control client 91 must know the previous play control condition in order to resume that operation. (E.g., play at 2×).

Figure 8C:
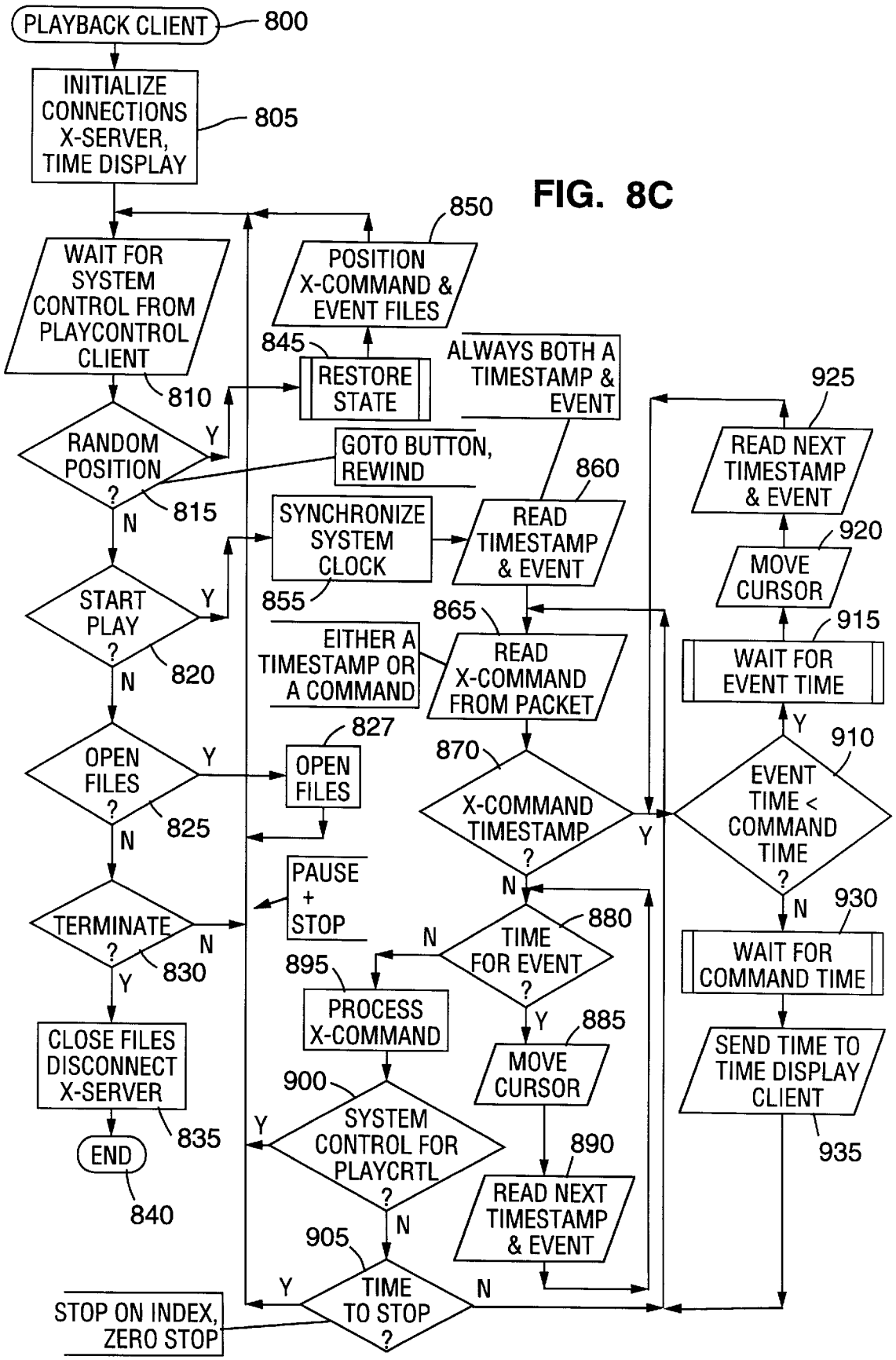

FIG. 8C shows the routine for the playback client 84. The process begins at step 800. In step 805, the playback client 84 connects to the X-server in X-windows system 50 and to the time display client 88. In step 810, it waits for a system control from play control client 91 (see corresponding step 725 in FIG. 8B). When it receives a system control from play control client 91, processing proceeds to step 815. In step 815, it is determined whether the system control is a random position instruction (e.g., go to or rewind). If so, processing flows to step 845, where the state is restored in order to allow play back to commence from the random position. The process of restoring the state will be discussed more fully with respect to FIG. 8E. Processing then proceeds to step 850 in which the pointers into the X-command file and event file are positioned to the selected random position. Processing then returns to step 810.

If the system control is an instruction to start play (play 1/10x, 1/5x, 1/2x, 2x, 4x, or max), processing flows from step 810 through step 815 and step 820 to step 855. In step 855, the X-server clock is synchronized to the system clock. In step 860, playback client 84 reads the first time stamp and the associated event after the selected random position out of the event file 70. Processing then proceeds to step 865 in which playback client 84 reads out the first item after the selected random position in the X-command file 68.

Processing then flows to step 870, where it is determined whether the item read out of the X-command file is a time stamp. If so, then in step 910, the time stamp read out of the event file is compared with the time stamp read out of the command file. If the event time stamp is earlier than the command time stamp, processing flows to step 915. In step 915, the routine waits until the play back clock catches up to the event time stamp. This process is described more fully with respect to FIG. 8D. When the playback clock reaches the time when the event occurred, processing flows to step 920 where the event is executed. Processing then flows to step 925 where the playback client reads the next time stamp and its associated event. If that event is still earlier than the first X-command time stamp, processing goes through the loop of steps 910 through 925 again until that is no longer the case.

Accordingly, when the time stamp of the next event is no longer earlier than the time stamp of the next command in command file 68, processing flows from step 910 to step 930. In step 930, the playback client waits for the playback time to catch up to the command time stamp. The waiting subroutine of step 930 is essentially identical to the waiting routine in step 915 (except for the fact that it is waiting for the command time rather than the event time) and is described fully below with respect to FIG. 8D. When the playback time catches up to the command time stamp, processing flows to step 935. In step 935, the time is sent to the time display client 88, which updates the display. Since, as previously discussed, the maximum possible time between command time-stamps is 100 milliseconds, the time displayed on the record GUI will be updated at least that frequently, if not more frequently. Processing then flows to step 880.

In step 880, the playback client determines whether it is time for an event. (Since step 910 only checks if the next event time stamp is earlier than the next command time stamp, this step can be reached when the next event and the next command have identical time stamps). Assuming that the next event and the next command do not have identical time stamps, processing flows to step 895, where the X-command associated with the time stamp is processed. Processing then flows to step 900 where it is inquired whether there has been a system control for playcontrol. If yes, processing flows back to step 810. If not, processing flows to step 905.

In step 905, it is determined whether playback must be stopped because stop on index or zero stop has been activated and the particular counter position has been reached. If yes, processing exits the play loop and flows back to step 810. If not, processing flows back to step 865 in the play loop, where the next X-command is read out of the X-command file 68.

Returning to step 870, if the X-command read out of the X-command file 68 in step 865 is not a time stamp, processing again flows to previously described step 880. However, this time, let us assume that it is time for an event. (Otherwise, processing will flow through previously described steps 895, 900 and 905 with respect to the new X-command). Processing will flow from step 880 to step 885. In step 885, the event associated with that time stamp is executed. Processing then flows to step 890 where the next time stamp in the event file and its associated event are read out of the event file 70. Processing then flows back to step 880.

Accordingly, it can be seen that within any given 10 millisecond interval, the X-commands will be read out in order, but at a speed dictated by the speed of the system and not by the time of the actual original occurrences. In other words, the resolution of the system is the selected time interval.

Further, it should also be noted that within a given time interval, an event will always be read out and executed before any of the X-commands which also occurred during that interval, regardless of whether the event actually occurred before or after any of the commands which occurred during that same 10 ms interval. Accordingly, the time stamp interval should be carefully selected and preferably should be faster than humanly perceptible.

If the system control received from play control client 91 in step 810 is not a random position control or a start play control, processing flows through steps 810, 815 and 820 to step 825. In step 825, it is determined if the system control is an open file(s) control. If so, processing flows to step 827, where the files are opened, and then back to step 810.

If the system control is none of the three above mentioned types of control, then processing flows through steps 810, 815, 820 and 825 to step 830. In step 830, it is determined if the control was a terminate control. If it was a terminate instruction, processing branches from step 830 to step 835. In step 835, the playback client 84 closes the disk files and disconnects from the X-server. The process then ends at step 840.

If not, then the only remaining possibilities are a stop or pause instruction. Accordingly, nothing need be done except to return to step 810. Particularly, we have left the play loop and the system simply waits in step 810 for another system control.

Figure 8D:
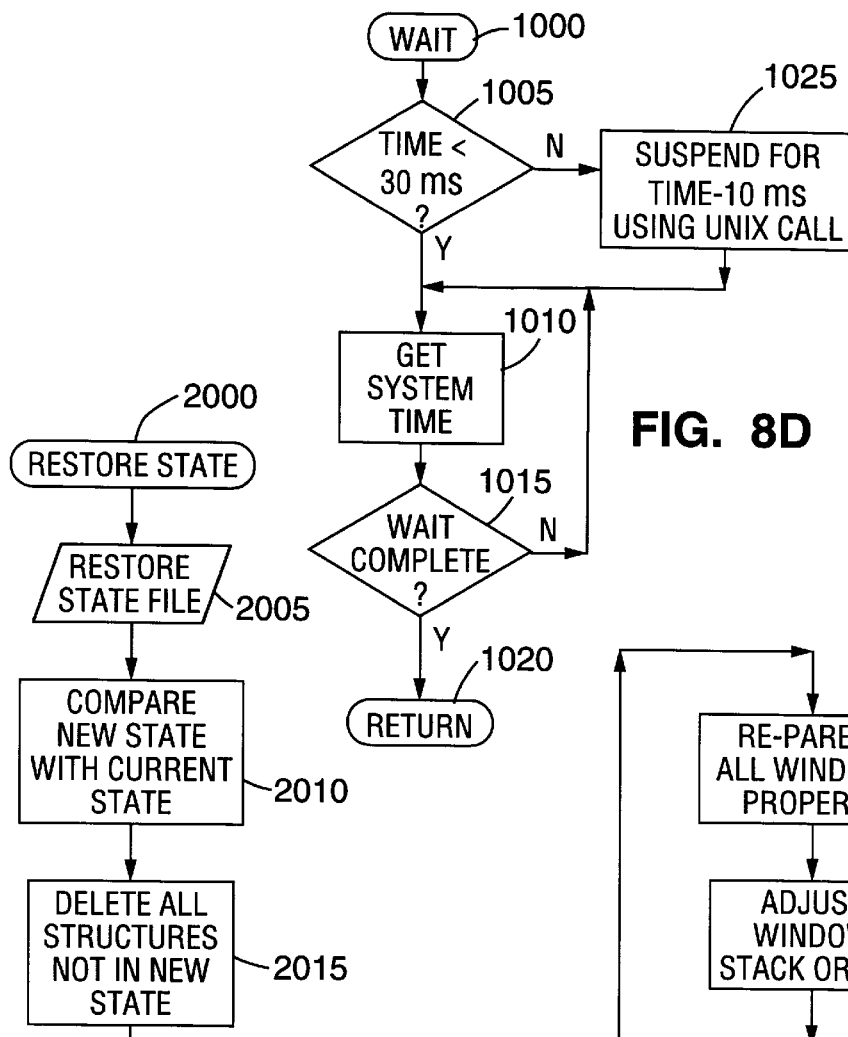

FIG. 8D illustrates the waiting subroutine represented by steps 915 and 930 in FIG. 8C. The waiting routine is designed to allow the playback client to sleep during long breaks between events or commands. Particularly, the routine is entered at step 1000. In step 1005, it is determined whether the waiting period for the next command or event is less than 30 milliseconds. If it is, processing flows into the loop defined by steps 1010 and 1015. In these steps, the system simply continuously observes the system playback clock to determine when it has reached the event or command time. At that point, processing returns via step 1020 to step 920 or 935 in FIG. 8C. However, if the time to the next command or event is greater than or equal to 30 milliseconds, processing flows to step 1025 where the play control client is suspended for the time-to-the-next-command (or event, whichever is first) minus 10 milliseconds. This allows other software constructs to utilize the processor time rather than wasting the whole time waiting for the next event or command. It should be noted, however, that the suspend time is for 10 milliseconds less than the actual wait in order to assure that the play control client will not miss the corresponding host clock time.

Figure 8E:
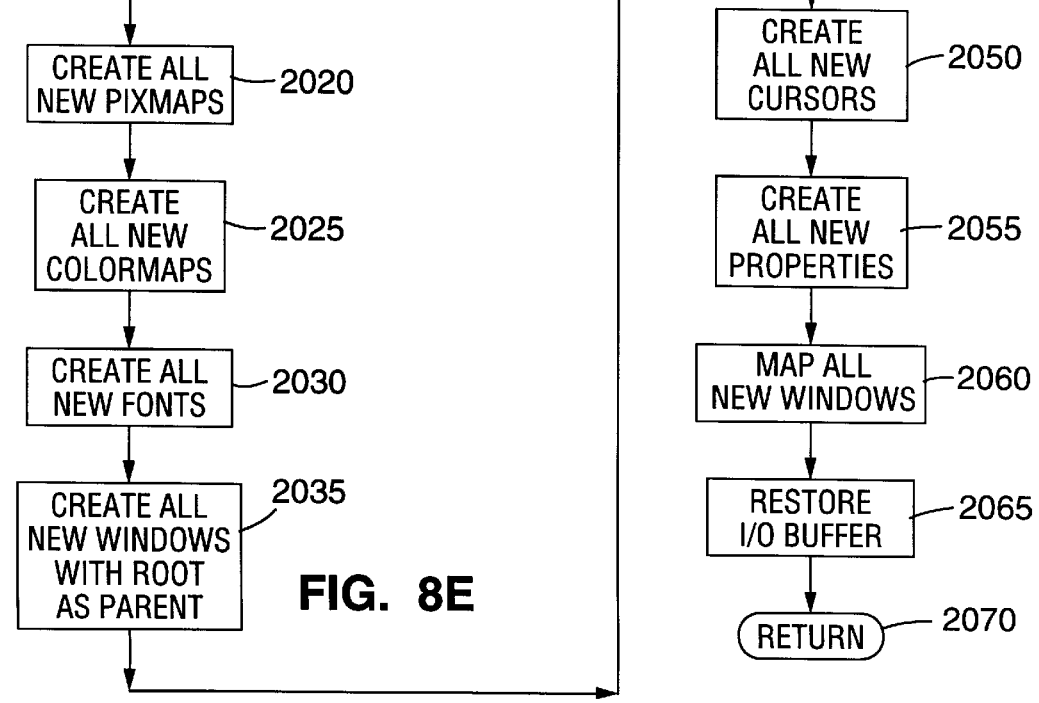

FIG. 8E is a detailed flow chart of the routine for restoring state from a random position which is represented by box step 845 in FIG. 8C. Rather than blanking out the screen and starting a new screen generation from scratch, in the preferred embodiment of the invention, the new screen uses as much of the pre-existing state of the display screen as possible. Although this makes the routine a little more difficult, it is less visually disruptive to the observer than blanking the screen and starting from scratch.

Accordingly, the process begins at step 2000. In step 2005, the state file for the selected random time is read out. In step 2010, that state is compared with the current state. In step 2015, all structures in the current state which do not exist in the newly selected random state are deleted. In steps 2020, 2025 and 2030, the pixel maps, color maps and fonts needed to draw the selected random state are created, respectively.

Next, in step 2035, all the windows in the selected state are created, but they are rooted to the parent. Once all the windows are created, then they are re-parented in the proper order in step 2040. Also, after all of the windows have been created, they are arranged in proper stacking order in step 2045. As previously noted, this order of creation avoids any hierarchy problems, since all of the windows are created before it is attempted to properly parent and stack them.

Next, in steps 2050 and 2055, the new cursors and new properties are created. In step 2060, the windows are mapped on the screen.

In step 2065, the I/O buffer is restored. This step is necessary because, due to the packetized nature of X-window protocol, a state save may have occurred in the middle of an instruction. Therefore, one must be able to restore the remainder of the instruction. Accordingly, the I/O buffer is stored as part of the state save in case of such an occurrence.

In step 270, processing returns to step 850 in FIG. 8C.

As previously noted, the mapping of the windows in step 2060 simply places the windows in proper size and position on the screen. It does not draw the contents of the windows. Also as previously noted, however, the first things stored in the X-command file after each state save is a series of EXPOSE events which will draw the contents of the windows. Accordingly, as the play control client 84 runs through steps 855 et al., the contents of the windows will be restored.

Having thus described a few particular embodiments of the invention, various alterations, modifications, and improvements will readily occur to those skilled in the art. For instance, the invention can be adapted easily to a multi-media environment in which a JPEG, IMPEG or otherwise compressed video signal is displayed in one or more windows. Such video data streams can be added in a manner similar to that described herein for adding an audio data stream. Such alterations, modifications and improvements as are made obvious by this disclosure are intended to be part of this description though not expressly stated herein, and are intended to be within the spirit and scope of the invention. Accordingly, the foregoing description is by way of example only, and is not limiting. The invention is limited only as defined in the following claims and equivalents thereto.

I claim:

1. A method of recording an X-Window session in which X-Window commands and events create a display on a display device that is coupled to a client program through a work station, said method comprising the steps of:

storing X-Window commands sent from said client program to said display device in a first memory file;

time stamping said X-Window commands in said first memory file with a first set of time stamps;

at fixed intervals, storing state information in a second memory file, said state information comprising information from which the state of the display at said fixed interval can be determined; and time stamping said state information in said second memory file with a second set of time stamps.

2. A method as set forth in claim 1 wherein said step of storing state information comprises storing X-Window CREATE commands.

3. A method as set forth in claim 1 further comprising the steps of providing a graphic user interface in the form of a video cassette recorder as a display on said display device for initiating a recording session and setting recording parameters.

4. An apparatus for recording an X-Window session in which X-Window commands and events create a display on a display device that is coupled to a client program through a work station, said apparatus comprising:

a work station including a graphic display device for generating a display;

means for intercepting X-Window commands sent from said client program to said display device;

means for storing said X-Window commands in a first memory file with a first set of periodic time stamps; and means for storing state information at fixed intervals in a second memory file, said state information comprising information from which the state of the display at said fixed interval can be determined.

5. An apparatus as set forth in claim 4 further comprising means for generating a graphic user interface in the form of a video cassette recorder as a display on said display device for initiating a recording session and setting recording parameters.

* * * * *